US009514369B2

(12) United States Patent
Ikeda

(10) Patent No.: US 9,514,369 B2
(45) Date of Patent: Dec. 6, 2016

(54) PROGRAM, METHOD, AND SYSTEM FOR DISPLAYING IMAGE RECOGNITION PROCESSING SUITABILITY

(71) Applicant: NEC Corporation, Tokyo (JP)

(72) Inventor: Hiroo Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/649,309

(22) PCT Filed: Nov. 29, 2013

(86) PCT No.: PCT/JP2013/007025
§ 371 (c)(1),
(2) Date: Jun. 3, 2015

(87) PCT Pub. No.: WO2014/087621
PCT Pub. Date: Jun. 12, 2014

(65) Prior Publication Data
US 2015/0302256 A1 Oct. 22, 2015

(30) Foreign Application Priority Data
Dec. 6, 2012 (JP) ................................ 2012-267553

(51) Int. Cl.
*G06K 9/00* (2006.01)
*G06K 9/32* (2006.01)
(Continued)

(52) U.S. Cl.
CPC ....... *G06K 9/00771* (2013.01); *G06K 9/00362* (2013.01); *G06K 9/3233* (2013.01);
(Continued)

(58) Field of Classification Search
None
See application file for complete search history.

(56) References Cited

U.S. PATENT DOCUMENTS 7,015,954 B1 * 3/2006 Foote .................... G06T 3/4038 348/159
8,081,227 B1 * 12/2011 Kim .................. H04N 5/23293 348/211.3
2010/0128983 A1 5/2010 Sugai
2010/0166302 A1 * 7/2010 Yao ....................... G06T 7/0002 382/164
2011/0090303 A1 * 4/2011 Wu ................... G06K 9/00228 348/14.16

FOREIGN PATENT DOCUMENTS

JP 2009-239821 10/2009
JP 2010-130087 6/2010
JP 2012-221437 11/2012

OTHER PUBLICATIONS

International Search Report and Written Opinion of ISA mailed Feb. 4, 2014 in corresponding PCT International Application.

* cited by examiner

*Primary Examiner* — Jason Heidemann
*Assistant Examiner* — Brian Shin
(74) *Attorney, Agent, or Firm* — Finnegan, Henderson, Farabow, Garrett & Dunner LLP

(57) ABSTRACT

A resolution evaluation section calculates a resolution evaluation value for each location within a monitoring target region excluding the presence area of an obstacle. A gazing point angle evaluation section calculates a gazing point angle evaluation value for each location within the monitoring target region excluding the presence area of the obstacle. The suitability calculation section calculates the suitability for each location within the monitoring target region excluding the presence area of the obstacle, on the basis of at least the resolution evaluation values and the gazing point angle evaluation values, the suitability indicating the degree to which the image of the monitoring target object placed at each location is suitable for the image recognition process. A display control section causes a display device to show regions within the monitoring target region which correspond to the suitabilities, in a mode commensurate with these suitabilities.

32 Claims, 17 Drawing Sheets

(51) Int. Cl.

| | |
|---|---|
| ***H04N 5/232*** | (2006.01) |
| ***H04N 7/18*** | (2006.01) |
| ***G08B 13/196*** | (2006.01) |

(52) U.S. Cl.

CPC .......... *H04N5/23216* (2013.01); *H04N 7/181* (2013.01); *G06K 2209/21* (2013.01); *G08B 13/19663* (2013.01)

PROGRAM, METHOD, AND SYSTEM FOR DISPLAYING IMAGE RECOGNITION PROCESSING SUITABILITY

CROSS-REFERENCE TO RELATED PATENT APPLICATIONS

This application is a National Stage Entry of International Application No. PCT/JP2013/007025, filed Nov. 29, 2013, which claims priority from Japanese Patent Application No. 2012-267553, filed Dec. 6, 2012. The entire contents of the above-referenced applications are expressly incorporated herein by reference.

TECHNICAL FIELD

The present invention relates to a program, method and system for displaying image recognition processing suitability which, before an image acquired from a camera is subjected to an image recognition process, evaluates the degree to which the location of a monitoring target object to be photographed in a real space is suitable for the image recognition process and then provides a user with the evaluation result.

BACKGROUND ART

PLT 1 describes a technique for displaying the photographing range of a camera. According to the technique described in PLT 1, when the location of a camera and the like are designated on a top view shown within a predetermined area in a display device, the display device shows a horizontal view in this top view and a vertical view in an elevation view. The horizontal view is the projection of the photographing range of the camera; the vertical view is a field of view of the camera in a vertical plane to the horizontal surface and contains the optical axis of the camera. FIG. 21 is a schematic view illustrating a horizontal view and a vertical view shown by the technique described in PLT 1.

According to the technique described in PLT 1, for example, when the location of a camera is designated on a top view 100, a camera indicator 101 representing the camera appears on the top view 100. Then, a user adjusts the height of the camera by dragging a camera indicator 111 shown on an elevation view 107. After the location of the camera is designated, a calculated horizontal view 105 and vertical view 115 appear on the top view 100 and an elevation view 107, respectively. The vertical view 115 contains an optical axis 110 of the camera. If the icon of a person is dragged and dropped onto the top view 100, a person indicator 102 appears at this location, and a person indicator 112 also appears in the elevation view 107. Likewise, if the location of a wall as an obstacle of the camera is designated, a wall indicator 103 appears on the top view. In FIG. 21, the person indicator in the top view 100 is denoted by the letter symbol "102"; the person indicator in the elevation view 107 is denoted by the letter symbol "112."

The technique described in PLT 1 provides the relationship between the field of view of a camera and a wall, a person or the like in a predetermined area by creating the above displays. This relationship will be used to adjust the location of the camera.

CITATION LIST

Patent Literature

PLT 1: JP2009-239821 A

SUMMARY OF INVENTION

Technical Problem

There are cases where an image recognition process is performed using an image of a monitoring target object (e.g., a person) which has been captured by a camera. Examples of an image recognition process include: a detection process through which a monitoring target object is detected from an image; and an identification process through which a monitoring target object is detected from an image and then identified. However, such an image recognition process is not limited to these examples. Before an image recognition process as described above is performed, it is preferable for a user to be able to grasp the degree to which the location of a monitoring target object in a real space that will be photographed by a camera is suitable for the image recognition process.

However, the invention described in PLT 1 is confined to the displaying of the horizontal view 105 and the vertical view 115 in accordance with the location of a camera. Consequently, a user cannot easily grasp where a person should be present in order to perform appropriately an image recognition process (e.g., person detection process or a person identification process). In the technique described in PLT 1, for example, only the vertical view 115 in a plane containing the optical axis 110 is shown as the vertical view 115. If an obstacle is present in a direction other than the optical axis within the top view 100 and a monitoring target object is partially hidden by this obstacle, an image recognition process is difficult to perform. Unfortunately, a user cannot grasp this situation from the elevation view 107.

In the invention described in PLT 1, as described above, a user has difficulty in grasping the degree to which the location of a monitoring target object is suitable for performing an image recognition process. It is also difficult to adjust the location of a camera so as to maximize an area in which a monitoring target object is allowed to be present while suitable for an image recognition process. If a plurality of cameras are present, it is more difficult to adjust the locations of the cameras so as to be suitable for an image recognition process.

An object of the present invention is to provide a program, method and system for displaying image recognition processing suitability, which are capable of providing the degree to which a photographed image in which a monitoring target object is present at any potential location is suitable for an image recognition process in such a way that a user can understand it easily.

Solution to Problem

A system for displaying image recognition processing suitability according to the present invention includes the following components. A resolution evaluation means is configured to perform a process of evaluating, by using a resolution evaluation function, a resolution of a monitoring target object in an image to be acquired when the monitoring target object placed within a preset monitoring target region is photographed and thereby calculating a resolution evaluation value of the monitoring target object at its placement location. The resolution evaluation function defines a relationship between the resolution and a resolution evaluation value indicating suitability for an image recognition process. Calculation of the resolution evaluation value is performed for each location within the monitoring target region excluding a presence area of an obstacle. A gazing point angle evaluation means is configured to perform a process of evaluating a gazing point angle by using a gazing point angle evaluation function and thereby calculating a gazing point angle evaluation value of the monitoring target object at its placement location. The gazing point angle denotes an angle that the ground forms with a straight line passing through a location of a camera and a gazing point in the monitoring target object placed within the monitoring target region. The gazing point angle evaluation function defines a relationship between the gazing point angle and a gazing point angle evaluation value indicating suitability for the image recognition process. Calculation of the gazing point angle evaluation value is performed for each location within the monitoring target region excluding the presence area of the obstacle. A suitability calculation means is configured to calculate suitability for each location within the monitoring target region excluding the presence area of the obstacle, on the basis of at least the resolution evaluation values and the gazing point angle evaluation values. The suitability indicates a degree to which the image of the monitoring target object placed at each location is suitable for the image recognition process. A display control means is configured to cause a display device to show regions within the monitoring target region which correspond to the suitabilities, in a mode commensurate with these suitabilities.

A system for displaying image recognition processing suitability according to the present invention includes the following components. A resolution evaluation means is configured to perform a process of evaluating, by using a resolution evaluation function, a resolution of a monitoring target object in an image to be acquired when the monitoring target object placed within a preset monitoring target region is photographed and thereby calculating a resolution evaluation value of the monitoring target object at its placement location. The resolution evaluation function defines a relationship between the resolution and a resolution evaluation value indicating suitability for an image recognition process. Calculation of the resolution evaluation value is performed for each location within the monitoring target region excluding a presence area of an obstacle. A gazing point angle evaluation means is configured to perform a process of evaluating a gazing point angle by using a gazing point angle evaluation function and thereby calculating a gazing point angle evaluation value of the monitoring target object at its placement location. The gazing point angle denotes an angle that the ground forms with a straight line passing through a location of a camera and a gazing point in the monitoring target object placed within the monitoring target region. The gazing point angle evaluation function defines a relationship between the gazing point angle and a gazing point angle evaluation value indicating suitability for the image recognition process. Calculation of the gazing point angle evaluation value is performed for each location within the monitoring target region excluding the presence area of the obstacle. A suitability calculation means is configured to calculate suitability for each location within the monitoring target region excluding the presence area of the obstacle, on the basis of at least the resolution evaluation values and the gazing point angle evaluation values. The suitability indicates a degree to which the image of the monitoring target object placed at each location is suitable for the image recognition process. An average suitability calculation means is configured to calculate average suitability denoting an average of, among the suitabilities calculated for each camera in relation to the locations within the monitoring target region excluding the presence area of the obstacle, a predetermined number of suitabilities sequentially arranged in decreasing order from the top. A display control means is configured to cause a display device to show regions within the monitoring target region which correspond to the average suitabilities, in a mode commensurate with these average suitabilities.

A system for displaying image recognition processing suitability according to the present invention includes the following components. A resolution evaluation means is configured to perform a process of evaluating, by using a resolution evaluation function, a resolution of a monitoring target object in an image to be acquired when the monitoring target object placed within a preset monitoring target region is photographed and thereby calculating a resolution evaluation value of the monitoring target object at its placement location. The resolution evaluation function defines a relationship between the resolution and a resolution evaluation value indicating suitability for an image recognition process. Calculation of the resolution evaluation value is performed for each location within the monitoring target region excluding a presence area of an obstacle. A gazing point angle evaluation means is configured to perform a process of evaluating a gazing point angle by using a gazing point angle evaluation function and thereby calculating a gazing point angle evaluation value of the monitoring target object at its placement location. The gazing point angle denotes an angle that the ground forms with a straight line passing through a location of a camera and a gazing point in the monitoring target object placed within the monitoring target region. The gazing point angle evaluation function defines a relationship between the gazing point angle and a gazing point angle evaluation value indicating suitability for the image recognition process. Calculation of the gazing point angle evaluation value is performed for each location within the monitoring target region excluding the presence area of the obstacle. A non-hiding rate calculation means is configured to calculate a non-hiding rate for each location within the monitoring target region excluding the presence area of the obstacle. The non-hiding rate denotes a rate of an area of the monitoring target object which is contained in an image and not hidden by the obstacle to the entire area of the monitoring target object in the image. The image is to be acquired when the monitoring target object placed within the monitoring target region is photographed. A suitability calculation means is configured to calculate first suitability and second suitability for each location within the monitoring target region excluding the presence area of the obstacle, as suitability representing a degree to which the image of the monitoring target object placed at each location is suitable for the image recognition process. The first suitability is calculated on the basis of the resolution evaluation values, the gazing point angle evaluation values and the non-hiding rates. The second suitability is calculated on the basis of the resolution evaluation values and the gazing point angle evaluation values without using the non-hiding rates. A camera determination means is configured to determine a plurality of cameras for each location within the monitoring target region excluding the presence area of the obstacle. The cameras corresponds to, among the first suitabilities calculated for each camera in relation to the respective locations, a predetermined number of first suitabilities sequentially arranged in decreasing order from the top. An average suitability calculation means is configured to calculate average suitability for each location within the monitoring target region excluding the presence area of the obstacle. The average suitability denotes an average of the second suitabilities calculated for each determined camera in relation to the respective locations. An average non-hiding rate calculation means is configured to calculate an average non-hiding rate for each location within the monitoring target region excluding the presence area of the obstacle. The average non-hiding rate denotes an average of the non-hiding rates calculated for each determined camera in relation to the respective locations. A display control means is configured to divide the monitoring target region in accordance with the average non-hiding rate for each location and to cause the display device to show regions within the monitoring target region which correspond to the average suitabilities, in a mode commensurate with these average suitabilities.

A method for displaying image recognition processing suitability according to the present invention includes the following processes. A process is performed, of evaluating, by using a resolution evaluation function, a resolution of a monitoring target object in an image to be acquired when the monitoring target object placed within a preset monitoring target region is photographed and thereby calculating a resolution evaluation value of the monitoring target object at its placement location. The resolution evaluation function defines a relationship between the resolution and a resolution evaluation value indicating suitability for an image recognition process. Calculation of the resolution evaluation value is performed for each location within the monitoring target region excluding a presence area of an obstacle. A process is performed, of evaluating a gazing point angle by using a gazing point angle evaluation function and thereby calculating a gazing point angle evaluation value of the monitoring target object at its placement location. The gazing point angle denotes an angle that the ground forms with a straight line passing through a location of a camera and a gazing point in the monitoring target object placed within the monitoring target region. The gazing point angle evaluation function defines a relationship between the gazing point angle and a gazing point angle evaluation value indicating suitability for the image recognition process. Calculation of the gazing point angle evaluation value is performed for each location within the monitoring target region excluding the presence area of the obstacle. Suitability is calculated for each location within the monitoring target region excluding the presence area of the obstacle, on the basis of at least the resolution evaluation values and the gazing point angle evaluation values. The suitability indicates a degree to which the image of the monitoring target object placed at each location is suitable for the image recognition process. A display device shows regions within the monitoring target region corresponding to the suitabilities, in a mode commensurate with these suitabilities.

A method for displaying image recognition processing suitability according to the present invention includes the following processes. A process is performed, of evaluating, by using a resolution evaluation function, a resolution of a monitoring target object in an image to be acquired when the monitoring target object placed within a preset monitoring target region is photographed and thereby calculating a resolution evaluation value of the monitoring target object at its placement location. The resolution evaluation function defines a relationship between the resolution and a resolution evaluation value indicating suitability for an image recognition process. Calculation of the resolution evaluation value is performed for each location within the monitoring target region excluding a presence area of an obstacle. A process is performed, of evaluating a gazing point angle by using a gazing point angle evaluation function and thereby calculating a gazing point angle evaluation value of the monitoring target object at its placement location. The gazing point angle denotes an angle that the ground forms with a straight line passing through a location of a camera and a gazing point in the monitoring target object placed within the monitoring target region. The gazing point angle evaluation function defines a relationship between the gazing point angle and a gazing point angle evaluation value indicating suitability for the image recognition process. Calculation of the gazing point angle evaluation value is performed for each location within the monitoring target region excluding the presence area of the obstacle. Suitability is calculated for each location within the monitoring target region excluding the presence area of the obstacle, on the basis of at least the resolution evaluation values and the gazing point angle evaluation values. The suitability indicates a degree to which the image of the monitoring target object placed at each location is suitable for the image recognition process. Average suitability is calculated, which denotes an average of, among the suitabilities calculated for each camera in relation to the locations within the monitoring target region excluding the presence area of the obstacle, a predetermined number of suitabilities sequentially arranged in decreasing order from the top. A display device shows regions within the monitoring target region which correspond to the average suitabilities, in a mode commensurate with these average suitabilities.

A method for displaying image recognition processing suitability according to the present invention includes the following processes. A process is performed, of evaluating, by using a resolution evaluation function, a resolution of a monitoring target object in an image to be acquired when the monitoring target object placed within a preset monitoring target region is photographed and thereby calculating a resolution evaluation value of the monitoring target object at its placement location. The resolution evaluation function defines a relationship between the resolution and a resolution evaluation value indicating suitability for an image recognition process. Calculation of the resolution evaluation value is performed for each location within the monitoring target region excluding a presence area of an obstacle. A process is performed, of evaluating a gazing point angle by using a gazing point angle evaluation function and thereby calculating a gazing point angle evaluation value of the monitoring target object at its placement location. The gazing point angle denotes an angle that the ground forms with a straight line passing through a location of a camera and a gazing point in the monitoring target object placed within the monitoring target region. The gazing point angle evaluation function defines a relationship between the gazing point angle and a gazing point angle evaluation value indicating suitability for the image recognition process. Calculation of the gazing point angle evaluation value is performed for each location within the monitoring target region excluding the presence area of the obstacle. A non-hiding rate is calculated for each location within the monitoring target region excluding the presence area of the obstacle. The non-hiding rate denotes a rate of an area of the monitoring target object which is contained in an image and not hidden by the obstacle to the entire area of the monitoring target object in the image. The image is to be acquired when the monitoring target object placed within the monitoring target region is photographed. First suitability and second suitability are calculated for each location within the monitoring target region excluding the presence area of the obstacle, as suitability representing a degree to which the image of the monitoring target object placed at each location is suitable for the image recognition process. The first suitability is calculated on the basis of the resolution evaluation values, the gazing point angle evaluation values and the non-hiding rates. The second suitability is calculated on the basis of the resolution evaluation values and the gazing point angle evaluation values without using the non-hiding rates. A plurality of cameras are determined for each location within the monitoring target region excluding the presence area of the obstacle. The cameras correspond to, among the first suitabilities calculated for each camera in relation to the respective locations, a predetermined number of first suitabilities sequentially arranged in decreasing order from the top. Average suitability is calculated for each location within the monitoring target region excluding the presence area of the obstacle. The average suitability denotes an average of the second suitabilities calculated for each determined camera in relation to the respective locations. An average non-hiding rate is calculated for each location within the monitoring target region excluding the presence area of the obstacle. The average non-hiding rate denotes an average of the non-hiding rates calculated for each determined camera in relation to the respective locations. The monitoring target region is divided in accordance with the average non-hiding rate for each location, and the display device shows regions within the monitoring target region which correspond to the average suitabilities, in a mode commensurate with the average suitabilities.

A program for displaying image recognition processing suitability according to the present invention causes a computer to perform the following processes. A resolution evaluation process is performed of evaluating, by using a resolution evaluation function, a resolution of a monitoring target object in an image to be acquired when the monitoring target object placed within a preset monitoring target region is photographed and thereby calculating a resolution evaluation value of the monitoring target object at its placement location. The resolution evaluation function defines a relationship between the resolution and a resolution evaluation value indicating suitability for an image recognition process. Calculation of the resolution evaluation value is performed for each location within the monitoring target region excluding a presence area of an obstacle. A gazing point angle evaluation process is performed, of evaluating a gazing point angle by using a gazing point angle evaluation function and thereby calculating a gazing point angle evaluation value of the monitoring target object at its placement location. The gazing point angle denotes an angle that the ground forms with a straight line passing through a location of a camera and a gazing point in the monitoring target object placed within the monitoring target region. The gazing point angle evaluation function defines a relationship between the gazing point angle and a gazing point angle evaluation value indicating suitability for the image recognition process. Calculation of the gazing point angle evaluation value is performed for each location within the monitoring target region excluding the presence area of the obstacle. A suitability calculation process is performed, of calculating suitability for each location within the monitoring target region excluding the presence area of the obstacle, on the basis of at least the resolution evaluation values and the gazing point angle evaluation values. The suitability indicates a degree to which the image of the monitoring target object placed at each location is suitable for the image recognition process. A display control process is performed, of causing a display device to show regions within the monitoring target region which correspond to the suitabilities, in a mode commensurate with these suitabilities.

A program for displaying image recognition processing suitability according to the present invention causes a computer to perform the following processes. A resolution evaluation process is performed, of evaluating, by using a resolution evaluation function, a resolution of a monitoring target object in an image to be acquired when the monitoring target object placed within a preset monitoring target region is photographed and thereby calculating a resolution evaluation value of the monitoring target object at its placement location. The resolution evaluation function defines a relationship between the resolution and a resolution evaluation value indicating suitability for an image recognition process. Calculation of the resolution evaluation value is performed for each location within the monitoring target region excluding a presence area of an obstacle. A gazing point angle evaluation process is performed, of evaluating a gazing point angle by using a gazing point angle evaluation function and thereby calculating a gazing point angle evaluation value of the monitoring target object at its placement location. The gazing point angle denotes an angle that the ground forms with a straight line passing through a location of a camera and a gazing point in the monitoring target object placed within the monitoring target region. The gazing point angle evaluation function defines a relationship between the gazing point angle and a gazing point angle evaluation value indicating suitability for the image recognition process. Calculation of the gazing point angle evaluation value is performed for each location within the monitoring target region excluding the presence area of the obstacle. A suitability calculation process is performed, of calculating suitability for each location within the monitoring target region excluding the presence area of the obstacle, on the basis of at least the resolution evaluation values and the gazing point angle evaluation values. The suitability indicates a degree to which the image of the monitoring target object placed at each location is suitable for the image recognition process. An average suitability calculation process is performed, of calculating average suitability denoting an average of, among the suitabilities calculated for each camera in relation to the locations within the monitoring target region excluding the presence area of the obstacle, a predetermined number of suitabilities sequentially arranged in decreasing order from the top. A display control process is performed, of causing a display device to show regions within the monitoring target region which correspond to the average suitabilities, in a mode commensurate with the average suitabilities.

A program for displaying image recognition processing suitability according to the present invention causes a computer to perform the following processes. A resolution evaluation process is performed, of evaluating, by using a resolution evaluation function, a resolution of a monitoring target object in an image to be acquired when the monitoring target object placed within a preset monitoring target region is photographed and thereby calculating a resolution evaluation value of the monitoring target object at its placement location. The resolution evaluation function defines a relationship between the resolution and a resolution evaluation value indicating suitability for an image recognition process. Calculation of the resolution evaluation value is performed for each location within the monitoring target region excluding a presence area of an obstacle. A gazing point angle evaluation process is performed, of evaluating a gazing point angle by using a gazing point angle evaluation function and thereby calculating a gazing point angle evaluation value of the monitoring target object at its placement location. The gazing point angle denotes an angle that the ground forms with a straight line passing through a location of a camera and a gazing point in the monitoring target object placed within the monitoring target region. The gazing point angle evaluation function defines a relationship between the gazing point angle and a gazing point angle evaluation value indicating suitability for the image recognition process. Calculation of the gazing point angle evaluation value is performed for each location within the monitoring target region excluding the presence area of the obstacle. A non-hiding rate calculation process is performed, of calculating a non-hiding rate for each location within the monitoring target region excluding the presence area of the obstacle. The non-hiding rate denotes a rate of an area of the monitoring target object which is contained in an image and not hidden by the obstacle to the entire area of the monitoring target object in the image. The image is to be acquired when the monitoring target object placed within the monitoring target region is photographed. A suitability calculation process is performed, of calculating first suitability and second suitability for each location within the monitoring target region excluding the presence area of the obstacle, as suitability representing a degree to which the image of the monitoring target object placed at each location is suitable for the image recognition process. The first suitability is calculated on the basis of the resolution evaluation values, the gazing point angle evaluation values and the non-hiding rates. The second suitability is calculated on the basis of the resolution evaluation values and the gazing point angle evaluation values without using the non-hiding rates. A camera determination process is performed, of determining a plurality of cameras for each location within the monitoring target region excluding the presence area of the obstacle. The cameras correspond to, among the first suitabilities calculated for each camera in relation to the respective locations, a predetermined number of first suitabilities sequentially arranged in decreasing order from the top. An average suitability calculation process is performed, of calculating average suitability for each location within the monitoring target region excluding the presence area of the obstacle. The average suitability denotes an average of the second suitabilities calculated for each determined camera in relation to the respective locations. An average non-hiding rate calculation process is performed, of calculating an average non-hiding rate for each location within the monitoring target region excluding the presence area of the obstacle. The average non-hiding rate denotes an average of the non-hiding rates calculated for each determined camera in relation to the respective locations. A display control process is performed, of dividing the monitoring target region in accordance with the average non-hiding rate for each location and causing the display device to show regions within the monitoring target region which correspond to the average suitabilities, in a mode commensurate with these average suitabilities.

Advantageous Effects of Invention

According to the present invention, it is possible to provide the degree to which a photographed image in which a monitoring target object is present at any potential location is suitable for an image recognition process in such a way that a user can understand it easily.

BRIEF DESCRIPTION OF DRAWINGS

FIG. 13 It depicts an illustrative view of another exemplary display in the second exemplary embodiment.

DESCRIPTION OF EMBODIMENTS

Exemplary embodiments of the present invention will be described below with reference to the accompanying drawings.

Exemplary Embodiment 1

Figure 1:
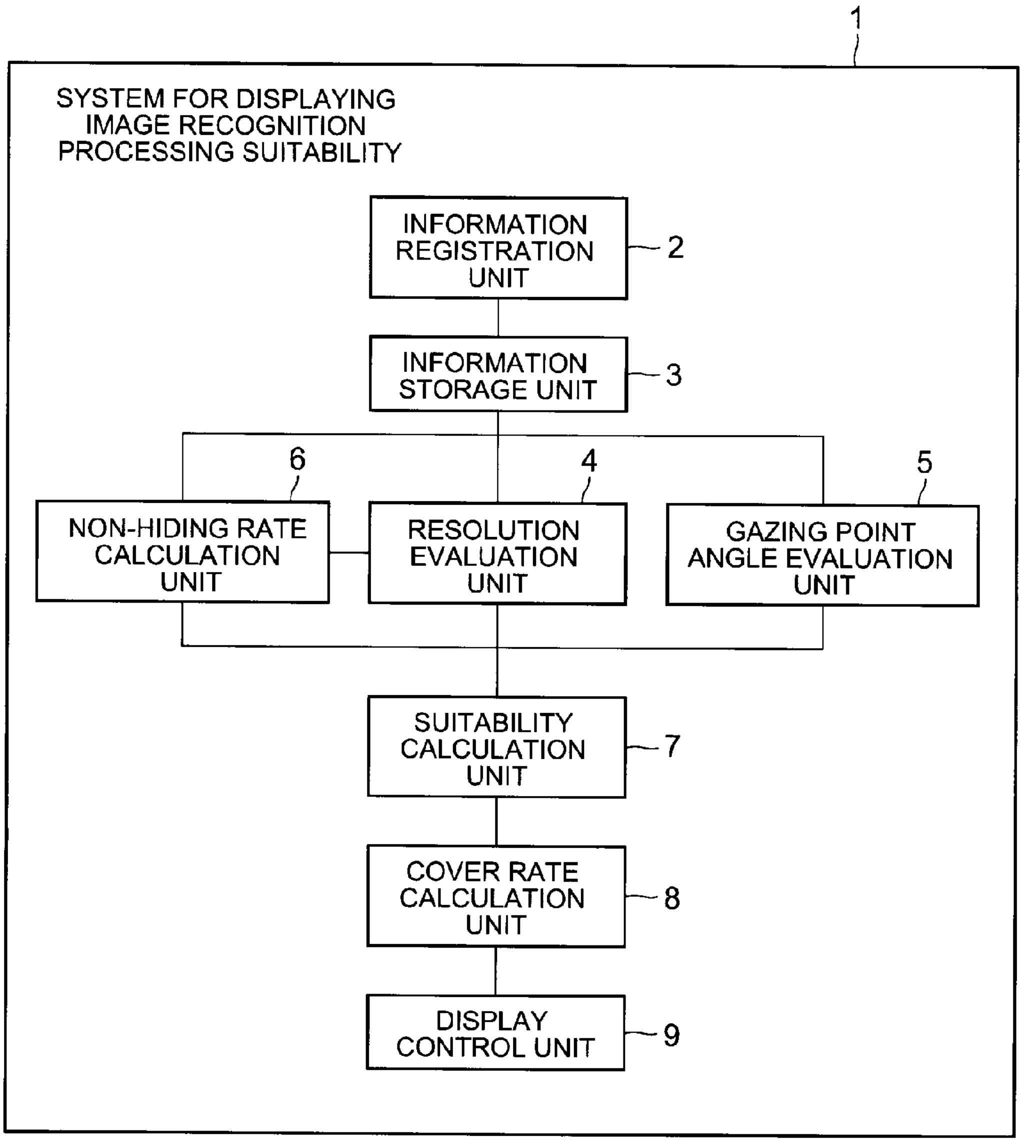
FIG. 1 It depicts a block diagram illustrating an exemplary configuration of a system for displaying image recognition processing suitability in a first exemplary embodiment of the present invention.

FIG. 1 is a block diagram illustrating an exemplary configuration of a system for displaying image recognition processing suitability in a first exemplary embodiment of the present invention. A system for displaying image recognition processing suitability 1 in the present invention includes an information registration unit 2, an information storage unit 3, a resolution evaluation unit 4, a gazing point angle evaluation unit 5, a non-hiding rate calculation unit 6, a suitability calculation unit 7, a cover rate calculation unit 8 and a display control unit 9.

The information storage unit 3 is a storage device that stores: camera parameters; the screen sizes of cameras; information showing a monitoring target region; information regarding a monitoring target object to be photographed by cameras; information regarding an obstacle placed within a monitoring target region; a resolution evaluation function; and a gazing point angle evaluation function. The above pieces of information are entered in the information registration unit 2 in response to, for example, a user's operation. The information registration unit 2 causes the information storage unit 3 to store the received pieces of information. Assuming that a plurality of cameras are used, a user enters camera parameters for each camera, and the information registration unit 2 causes the information storage unit 3 to store these camera parameters of each camera. A description will be given below of various pieces of information to be stored in the information storage unit 3.

The camera parameters include pieces of information regarding the placement locations, posture, angles of views, focal lengths and lens distortion of cameras.

The monitoring target region is a region in a real space which will be photographed by cameras and is an image recognition process target in an image acquired as a result of the photographing. The information storage unit 3 stores the confines of the monitoring target region.

The information regarding a monitoring target object contains information on the placement location, shape, size and so on of a monitoring target object. Likewise, the information regarding an obstacle contains information on the placement location, shape, size and so on of an obstacle.

Figure 2:
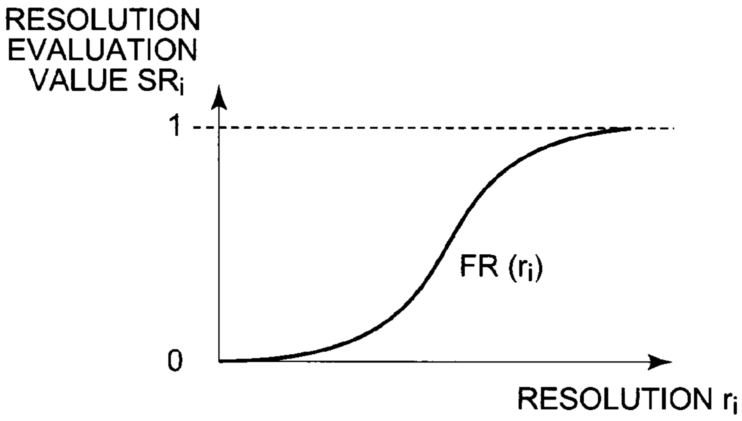
FIG. 2 It depicts a graph showing an exemplary resolution evaluation function.

The resolution evaluation function is a function for use in converting the resolution of a monitoring target object in an image into a resolution evaluation value; the resolution evaluation value indicates the suitability for an image recognition process. FIG. 2 is a graph showing an exemplary resolution evaluation function. As the resolution evaluation value approximates to 1, the resolution is more suitable for an image recognition process. As the resolution evaluation value approximates to 0, the resolution is less suitable for an image recognition process. In general, as the resolution increases, a monitoring target object exhibits increased sharpness and accordingly becomes more suitable for an image recognition process. The resolution evaluation function is preset in accordance with an image recognition process to be employed. The resolution recited herein may correspond to, for example, the total area of the pixels forming a monitoring target object in an image or the area of a rectangle containing a monitoring target object in an image. Alternatively, the resolution may correspond to the total size of pixels arrayed vertically or laterally which form a rectangle containing a monitoring target object in an image.

Figure 3:
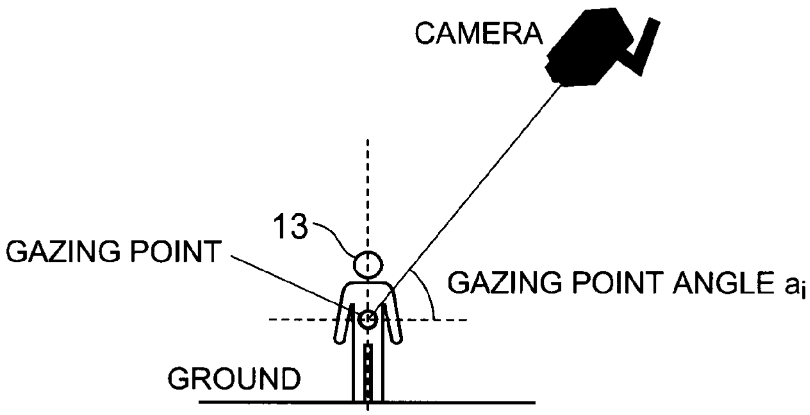
FIG. 3 It depicts an illustrative view of the gazing point angle with respect to a monitoring target object.

The gazing point angle evaluation function is a function for use in converting the gazing point angle of a monitoring target object into a gazing point angle evaluation value; the gazing point angle evaluation value indicates the suitability for an image recognition process. FIG. 3 is an illustrative view of the gazing point angle with respect to a monitoring target object. In FIG. 3, the monitoring target object is assumed to be a person. The gazing point angle with respect to a monitoring target object 13 is equal to an angle that a straight line forms with the ground; the straight line is drawn by connecting the respective locations of a camera and the gazing point of the monitoring target object 13. The location of the gazing point of the monitoring target object 13 recited herein may be an arbitrary point inside the monitoring target object 13 which indicates the remarkable location of the monitoring target object 13. For example, the center of gravity of the monitoring target object 13 or the middle of the central axis thereof may be set as the location of its gazing point. In FIG. 3, the camera faces toward the monitoring target object; however the orientation of the camera is not limited. More specifically, if the locations of a camera and the gazing point of the monitoring target object 13 are fixed, the gazing point angle is determined independently of the orientation of the camera.

Figure 4:
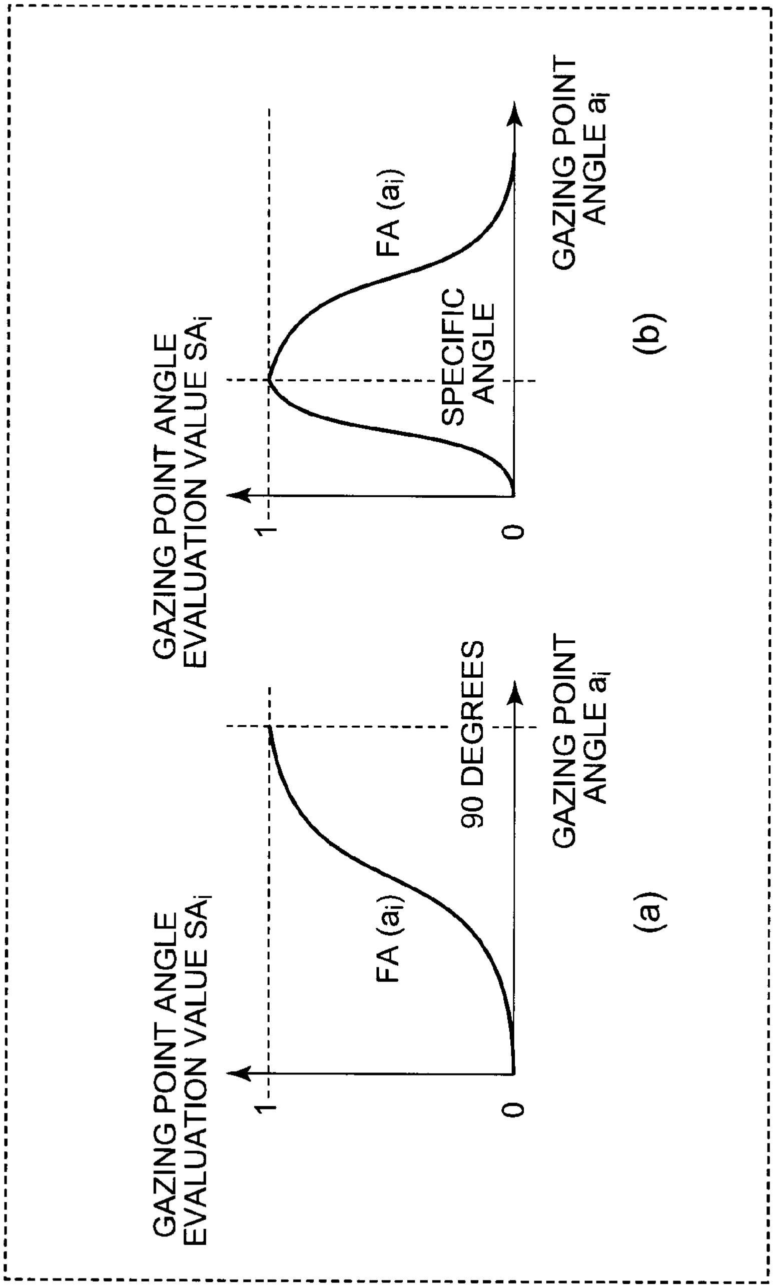
FIG. 4 It depicts graphs showing exemplary gazing point angle evaluation functions.

FIG. 4 is graphs showing exemplary gazing point angle evaluation functions. Assuming that an image recognition process is a process of estimating the locations of monitoring target objects, it is preferable that these monitoring target objects do not overlap each other largely or they do not overlap an obstacle largely. Accordingly, as depicted in FIG. 4(*a*), the gazing point angle evaluation function needs only be set such that as the gazing point angle increases to 90° (i.e., as the photographing location is closer to the top), the gazing point angle evaluation value approximates to 1 or as the gazing point angle decreases to 0°, the gazing point angle evaluation value approximates to 0. Assuming that an image recognition process is an object detection process or an object identification process, the gazing point angle preferably approximates to a specific angle. Accordingly, as depicted in FIG. 4(*b*), the gazing point angle evaluation function needs only be set such that as the gazing point angle approximates to the specific angle, the gazing point angle evaluation value increases.

In the exemplary embodiments, both the resolution evaluation value and the gazing point angle evaluation value will be assumed to be in the range of 0 to 1.

The resolution evaluation unit 4 generates respective images to be acquired by photographing a monitoring target object placed at potential locations within the monitoring target region excluding the presence area of an obstacle with a camera; the camera conforms to the camera parameters. The resolution evaluation unit 4 generates these images with, for example, computer graphics (CG). These resultant images are not real images acquired through the photographing of a camera. In fact, they are simulated images that are similar to real images acquired by photographing a space in a monitoring target region containing the monitoring target object with a camera conforming to the camera parameters. If an obstacle is present within the monitoring target region, the resolution evaluation unit 4 generates an image to be acquired by photographing not only the monitoring target object but also the obstacle, the location, shape and size of which match those stored in the information storage unit 3. Then, the resolution evaluation unit 4 obtains the resolutions from the generated images, and calculates the resolution evaluation values by using the resolution evaluation function.

In short, the resolution evaluation unit 4 performs a process of: generating an image in which a monitoring target object is placed within a monitoring target region; obtaining the resolution from this image; and calculating the resolution evaluation value. This process is carried out for each of potential locations excluding the presence area of an obstacle within a monitoring target region. Furthermore, the resolution evaluation unit 4 also performs this process for each camera.

The resolution evaluation unit 4 does not necessarily have to generate images and calculate the resolution evaluation values, as described above, at sequential locations arranged densely. For example, the resolution evaluation unit 4 may divide a monitoring target region (excluding the presence area of an obstacle) into some regions with an equal size, and determine a representative location of each divisional region. Following this, the resolution evaluation unit 4 may generate an image in which a monitoring target object is placed at each representative location, and obtain the resolution from each image to calculate the resolution evaluation value. Then, the resolution evaluation unit 4 may set the resultant resolution evaluation values to those for the divisional regions containing the respective representative locations. For the purpose of giving a simple description below, the resolution evaluation unit 4 is assumed to generate an image and calculates the resolution evaluation value for each of the representative locations of divisional regions. Here, these representative locations are referred to below as monitoring locations.

Herein, monitoring locations within a monitoring target region are denoted by i; the resolutions acquired from the images generated for the monitoring locations i are denoted by $r_i$. The resolution evaluation values acquired from the resolutions $r_i$ are denoted by $SR_i$.

Calculating a resolution evaluation value $SR_i$ is equivalent to evaluating the sharpness of a monitoring target object in an image by using the resolution of the monitoring target object. This sharpness is important in evaluating the suitability for an image recognition process.

Figure 5:
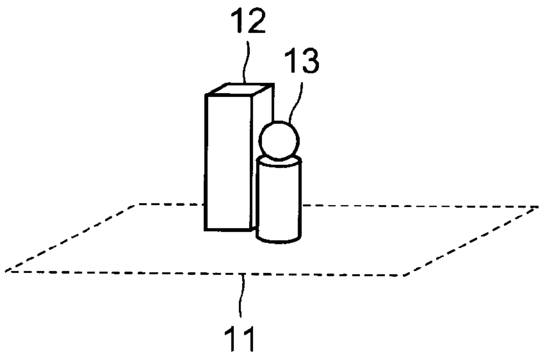
FIG. 5 It depicts a schematic view illustrating a monitoring target object placed within a monitoring target region at a monitoring location.

A description will be given of a specific process performed by the resolution evaluation unit 4. FIG. 5 is a schematic view illustrating the monitoring target object 13 placed within a monitoring target region 11 at a monitoring location. FIG. 5 also illustrates an obstacle 12 present within the monitoring target region 11. The resolution evaluation unit 4 defines states as exemplified in FIG. 5 on the basis of the information showing a monitoring target region, the information regarding a monitoring target object and the information regarding an obstacle, all of which are stored in the information storage unit 3. Following this, the resolution evaluation unit 4 generates the CG images of the states in FIG. 5 which would be acquired through the photographing of a camera conforming to the camera parameters stored in the information storage unit 3. From these generated images, the resolution evaluation unit 4 acquires the resolutions $r_i$. Then, the resolution evaluation unit 4 evaluates the resolutions by using the resolution evaluation function $FR(r_i)$, thereby calculating the resolution evaluation values $SR_i$. More specifically, the resolution evaluation unit 4 calculates the resolution evaluation values $SR_i$ through the computation using equation (1) described below.

$$SR_i=FR(r_i) \qquad \text{Equation (1)}$$

The gazing point angle evaluation unit 5 defines the states of the monitoring target object placed within the monitoring target region at the potential locations excluding the presence area of the obstacle. Then, the gazing point angle evaluation unit 5 calculates a straight line that passes through the gazing point of the monitoring target object in each state and the location of the camera by using the camera parameters. Following this, the gazing point angle evaluation unit 5 calculates the angle that each straight line forms with the ground, as the gazing point angle. Then, the gazing point angle evaluation unit 5 calculates the gazing point angle evaluation values for the respective potential locations within the monitoring target region which excludes the presence area of the obstacle by using the gazing point angle evaluation function.

In the above case, the monitoring locations may be used as the locations of the monitoring target object which are used to calculate the gazing point angle evaluation values. Furthermore, the gazing point angle evaluation unit 5 may set the gazing point angle evaluation value calculated for a certain monitoring location, as that for a divisional region, the representative location of which is identical to this monitoring location.

Herein, the gazing point angles calculated for the monitoring locations i within the monitoring target region are denoted by $a_i$. The gazing point angle evaluation values acquired from the gazing point angles $a_i$ are denoted by $SA_i$.

In short, the gazing point angle evaluation unit 5 determines the gazing point angles $a_i$ for the monitoring locations i, then evaluates the gazing point angles $a_i$ by using the gazing point angle evaluation function $FA(a_i)$, thereby calculating the gazing point angle evaluation values $SA_i$. More specifically, the gazing point angle evaluation unit 5 calculates the gazing point angle evaluation values $SA_i$ through the computation using equation (2) described below.

$$SA_i=FA(a_i) \qquad \text{Equation (2)}$$

The gazing point angle evaluation unit 5 performs the process of calculating the gazing point angle evaluation value $SA_i$ for each monitoring location.

The gazing point angle evaluation unit 5 performs the process through which the gazing point angle evaluation values are calculated for respective monitoring locations, for each camera.

Calculating the gazing point angle evaluation values $SA_i$ is equivalent to evaluating the difference in an appearance depending on the photographing angle of a camera, the overlapping of monitoring target objects and the like by using the gazing point angles with respect to the monitoring target objects. The appearance, overlapping and the like are important in evaluating the suitability for an image recognition process.

The non-hiding rate calculation unit 6 calculates the non-hiding rate for each monitoring location. This non-hiding rate is equal to a rate of the area of a monitoring target object that is contained in an image and is not hidden by an obstacle to the entire area of the monitoring target object; the image has been generated by the resolution evaluation unit 4 (i.e., the image contains the monitoring target object placed in the monitoring target region). The non-hiding rate is in the range of 0 to 1.

Figure 6:
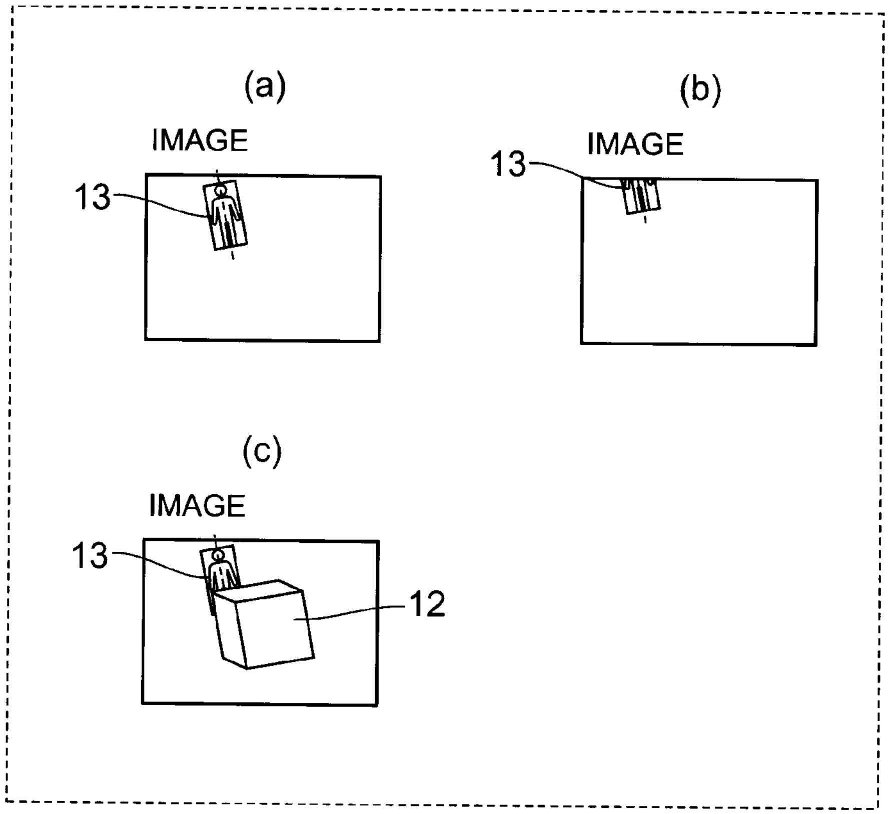
FIG. 6 It depicts illustrative views of exemplary images created by the resolution evaluation unit.

FIG. 6 is illustrative views of exemplary images created by the resolution evaluation unit 4. The image illustrated in FIG. 6(*a*) contains the entire monitoring target object 13. The non-hiding rate of the example illustrated in FIG. 6(*a*) is "1."

Referring to the exemplary image illustrated in FIG. 6(*b*), the monitoring target object 13 is partially contained in the image. Referring to the exemplary image illustrated in FIG. 6(*c*), the monitoring target object 13 is partially hidden by the obstacle 12. Accordingly, the images depicted in FIGS. 6(*b*) and 6(*c*) each have a non-hiding rate less than 1.

For example, the non-hiding rate calculation unit 6 calculates a non-hiding rate in the following manner. The non-hiding rate calculation unit 6 generates an image that contains no obstacle and is large enough to accommodate the monitoring target object 13. This image is an image generated on the assumption that an image acquired from a camera has a sufficiently large size. Then, the non-hiding rate calculation unit 6 incorporates the monitoring target object 13 into the image so as not to be hidden by an obstacle. From this image, the non-hiding rate calculation unit 6 determines the number of pixels (A) forming the monitoring target object 13. Likewise, from the image generated by the resolution evaluation unit 4, the non-hiding rate calculation unit 6 determines the number of pixels (B) forming the area of the monitoring target object 13 which is included in the image and is not hidden by the obstacle. Then, the non-hiding rate calculation unit 6 calculates a rate of the number of pixels B to the number of pixels A, and sets this rate to the non-hiding rate.

Hereinafter, when a monitoring target object is placed at monitoring locations i, the non-hiding rates (referred to below as non-hiding rates for monitoring locations i) that are calculated on the basis of images generated by the resolution evaluation unit 4 are denoted by $\alpha_i$.

The non-hiding rate calculation unit 6 performs a process through which the non-hiding rates are calculated for respective monitoring locations, for each camera.

The suitability calculation unit 7 calculates the suitability for a monitoring location i of interest, on the basis of the resolution evaluation value $SR_i$, the gazing point angle evaluation value $SA_i$ and the non-hiding rate $\alpha_i$ that have been calculated for the monitoring location i. This calculation is made for each monitoring location. The suitability for the monitoring location i is a value that represents the degree to which an image acquired by photographing a monitoring target object placed at the monitoring location i with a camera conforming to camera parameters is suitable for an image recognition process (i.e., an index that indicates how much the image is suitable for an image process).

Hereinafter, the suitabilities for the monitoring locations i are denoted by $T_i$. For example, the suitability calculation unit 7 may calculate the suitability $T_i$ from the product of the resolution evaluation value $SR_i$, gazing point angle evaluation value $SA_i$ and non-hiding rate $\alpha_i$ for each monitoring location i. More specifically, the suitability calculation unit 7 may calculate the suitabilities $T_i$ for the monitoring locations i through the computation using equation (3) described below.

$$T_i=SR_i\times SA_i\times\alpha_i \qquad \text{Equation (3)}$$

The suitability calculation unit 7 may weight the resolution evaluation values and the gazing point angle evaluation values when calculating the suitabilities $T_i$. For example, the suitability calculation unit 7 may calculate the suitabilities $T_i$ for the monitoring locations i through the computation using equation (4) described below.

$$T_i=\{(W_i\times SR_i\times\alpha_i)+(W_2\times SA_i\times\alpha_i)\}/(W_1+W_2) \qquad \text{Equation (4)}$$

In equation (4), $W_i$ denotes the weight coefficients for the resolution evaluation values; $W_2$ denotes the weight coefficients for the gazing point angle evaluation values. These weight coefficients $W_1$ and $W_2$ are preferably preset.

If a single preset weight coefficient is used, the suitability calculation unit 7 may calculate the suitabilities $T_i$ for the monitoring locations i through the computation using equation (5) described below.

$$T_i=W\times SR_i\times\alpha_i+(1-W)\times SA_i\times\alpha_i \qquad \text{Equation (5)}$$

In equation (5), W denotes a preset weight coefficient.

Any of equations (3) to (5) can be used to determine suitabilities. As the suitability $T_i$ for a monitoring location i increases, a photographed image in which a monitoring target object is placed at this monitoring location i is more suitable for an image recognition process.

After calculating the suitability for each monitoring location, the suitability calculation unit 7 identifies the regions from the monitoring target region which correspond to the calculated suitabilities.

The suitability calculation unit 7 performs, for each camera, the process through which the suitabilities are calculated for the respective monitoring locations and the regions corresponding to these suitabilities are identified.

The cover rate calculation unit 8 calculates the cover rate for each camera. The cover rate represents the rate of the sum of calculated suitabilities to the number of monitoring locations. More specifically, the cover rate calculation unit 8 calculates the cover rate for each camera through the computation using equation (6) described below.

[Mathematical formula 1]

$$\text{Cover Rate} = \frac{\text{Sum of Calculated Average Suitabilities}}{\text{The Number of Monitoring Locations}} \qquad \text{Equation (6)}$$

It can also be said that the cover rate is an index that indicates a rate of an area of the monitoring target region which can be subjected to an image recognition process appropriately to the entire area of the monitoring target region.

The cover rate calculated by using equation (6) in the first exemplary embodiment can also be referred to as a "cover rate based on suitability," but it will be referred to as simply a cover rate, for the purpose of simplifying the following description.

When calculating the cover rate through the computation using equation (6), the cover rate calculation unit 8 may use suitabilities that fall within a designated numeral range, as targets to be added at the top of the fraction on the right side of equation (6). More specifically, when calculating a cover rate through the computation using equation (6), the cover rate calculation unit 8 adds up suitabilities that fall within a designated numeral range at the top of the fraction on the right side of equation (6), but ignores suitabilities that fall outside the designated numeral range (e.g., regards these suitabilities as 0). There is no specific limitation on how to designate this numeral range. For example, a user may designate the numeral range of suitability by entering it into the system for displaying image recognition processing suitability 1.

The display control unit 9 causes a display device (not illustrated) to show the regions in the monitoring target region which correspond to the suitabilities, in a mode commensurate with these suitabilities. The display control unit 9 performs this display process for each camera. The display control unit 9 also causes the display device to show the cover rate calculated for each camera. This display device may be provided in the system for displaying image recognition processing suitability.

The information registration unit 2, the resolution evaluation unit 4, the gazing point angle evaluation unit 5, the non-hiding rate calculation unit 6, the suitability calculation unit 7, the cover rate calculation unit 8 and the display control unit 9 are implemented by using, for example, the CPU in a computer that operates in accordance with a program for displaying image recognition processing suitability. In this case, the CPU may read the program for displaying image recognition processing suitability, and operate in accordance with this program, as the information registration unit 2, the resolution evaluation unit 4, the gazing point angle evaluation unit 5, the non-hiding rate calculation unit 6, the suitability calculation unit 7, the cover rate calculation unit 8 and the display control unit 9. Furthermore, the program for displaying image recognition processing suitability may be stored in a computer readable recording medium. Alternatively, the information registration unit 2, the resolution evaluation unit 4, the gazing point angle evaluation unit 5, the non-hiding rate calculation unit 6, the suitability calculation unit 7, the cover rate calculation unit 8 and the display control unit 9 may be implemented by using respective independent hardware components.

Figure 7:
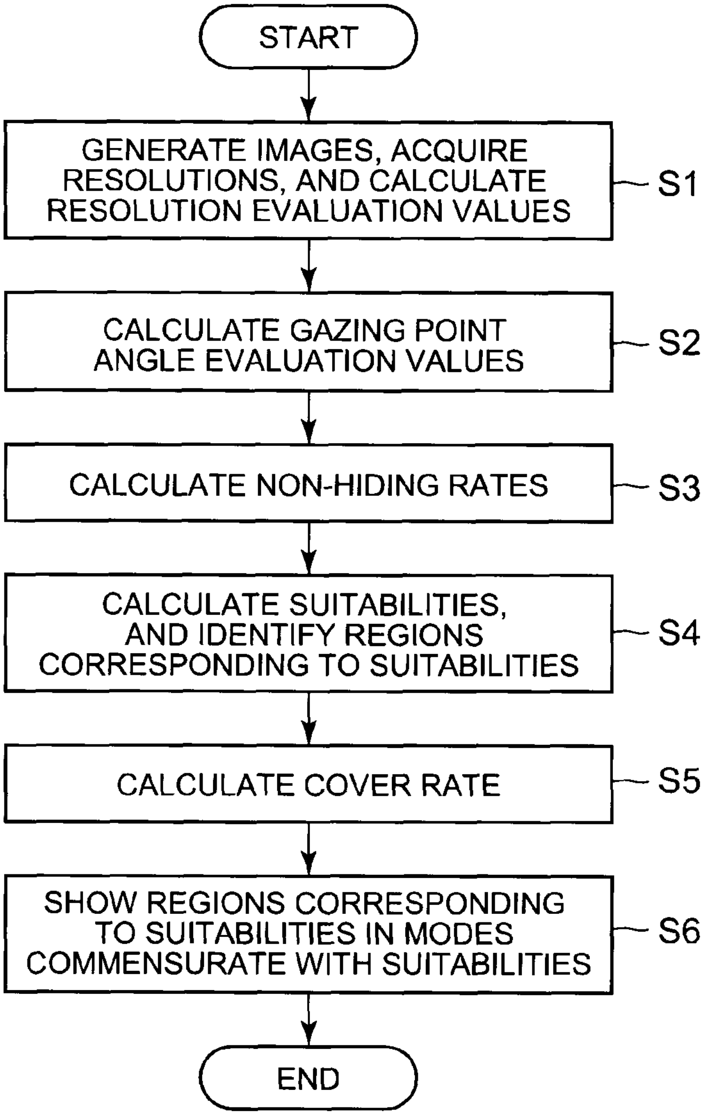
FIG. 7 It depicts a flowchart of the progress of an exemplary process in the first exemplary embodiment of the present invention.

Next, a description will be given of the progress of a process in this exemplary embodiment. FIG. 7 is a flowchart depicting the progress of an exemplary process in the first exemplary embodiment of the present invention. In this case, the information storage unit 3 is assumed to already store various pieces of information, including the camera parameters.

First, the resolution evaluation unit 4 defines respective states where a monitoring target object is placed within a monitoring target region at potential locations (monitoring locations) excluding the presence area of an obstacle. Then, the resolution evaluation unit 4 generates CG images that would be captured by a camera conforming to the camera parameters. Then, the resolution evaluation unit 4 acquires the resolution from each image. As described above, the total area of pixels forming the monitoring target object in each image, the total area of pixels forming a rectangle containing the monitoring target object in each image, or the total size of pixels arraying vertically or laterally in this rectangle may be employed as the resolution. The resolution evaluation unit 4 calculates the resolution evaluation values $SR_i$ for the monitoring locations i by substituting the resolutions $r_i$ acquired from the images for the monitoring locations i and the resolution evaluation function into equation (1) (Step S1). At Step S1, the resolution evaluation unit 4 calculates the resolution evaluation value for each monitoring location. In addition, the resolution evaluation unit 4 performs the process at Step S1 for each camera.

The gazing point angle evaluation unit 5 calculates the gazing point angle evaluation values for the respective monitoring locations (Step S2). More specifically, the gazing point angle evaluation unit 5 defines the respective states where the monitoring target object is placed at monitoring locations. Then, the gazing point angle evaluation unit 5 calculate straight lines that pass through the gazing points of the monitoring target object in this state and the location of the camera, and calculates the angles (gazing point angles) that the straight lines form with the ground. The gazing point angle evaluation unit 5 calculates the gazing point angle evaluation values $SA_i$ for the monitoring locations i by substituting the gazing point angles $a_i$ calculated for the monitoring locations i and the gazing point angle evaluation function into equation (2). At Step S2, the gazing point angle evaluation unit 5 performs this process for each monitoring location. In addition, the gazing point angle evaluation unit 5 performs the process at Step S2 for each camera.

The non-hiding rate calculation unit 6 calculates the non-hiding rates for the monitoring locations (Step S3). More specifically, for example, the non-hiding rate calculation unit 6 calculates the non-hiding rates $\alpha_i$ for the monitoring locations i from the images that the resolution evaluation unit 4 has generated for the monitoring locations i. At Step S3, the non-hiding rate calculation unit 6 performs this process for each monitoring location. In addition, the non-hiding rate calculation unit 6 performs the process at Step S3 for each camera.

The suitability calculation unit 7 calculates the suitabilities for the monitoring locations by using the resolution evaluation values, gazing point angle evaluation values and non-hiding rates calculated at Steps S1 to S3 (Step S4). For example, the suitability calculation unit 7 may calculate the suitabilities $T_i$ for the monitoring locations i through the computation using equation (3). Alternatively, the suitability calculation unit 7 may calculate the suitabilities $T_i$ for the monitoring locations i through the computation using equation (4) or (5). At Step S4, the suitability calculation unit 7 calculates the suitability in the above manner for each monitoring location. Furthermore, at Step S4, the suitability calculation unit 7 identifies the regions from the monitoring target region which correspond to the suitabilities. For example, the suitability calculation unit 7 may identify regions corresponding to the numeral range for each numeral range of suitability. The suitability calculation unit 7 performs the process at Step S4 for each camera.

The cover rate calculation unit 8 calculates the cover rate by using the equation (6) (Step S5). The cover rate calculation unit 8 calculates the cover rate for each camera.

Figure 8:
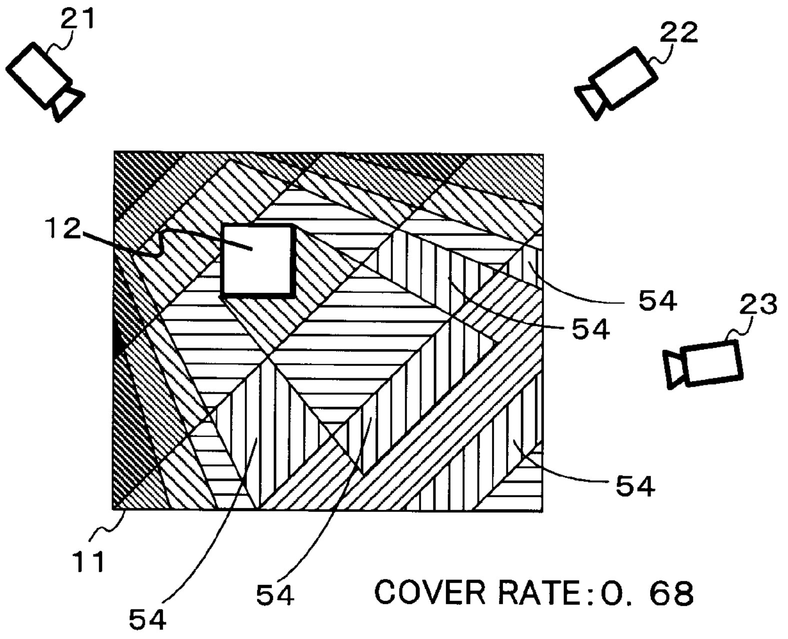
FIG. 8 It depicts an illustrative view of an exemplary display of regions corresponding to individual suitabilities.

The display control unit 9 causes the display device (not illustrated) to show the regions that have been identified at Step S4 as regions within the monitor target region which correspond to the suitabilities, in a mode commensurate with these suitabilities (Step S6). FIG. 8 is an illustrative view of an exemplary display of regions corresponding to individual suitabilities. For example, as in FIG. 8, with regard to a certain camera 21, the display control unit 9 causes the display device to show the regions corresponding to the suitabilities which have been identified from the monitoring target region 11, in a mode commensurate with these suitabilities. In an exemplary mode commensurate with suitabilities, regions are distinguished from one another by different colors or patterns, varying brightness or the like in accordance with suitability. When showing these regions, the display control unit 9 may also distinguish between the regions by using items other than colors, patterns and brightness. In the example depicted in FIG. 8, the regions corresponding to the suitabilities are distinguished from one another by patterns.

As exemplified in FIG. 8, the display control unit 9 causes the display device to show the monitoring target region 11 with the presence area of the obstacle 12 superimposed thereon. The presence area of an obstacle may be shown with a specific color (that may be translucent). The edge of the presence area of an obstacle may be shown with a specific type of line. In the example depicted in FIG. 8, the presence area of the obstacle 12 is filled with a white color and its edge is shown by a solid line.

In FIG. 8, the regions that are identified from the monitoring target region 11 in relation to the camera 21 are shown. Likewise, the display control unit 9 causes the display device to show the regions which are identified from the monitoring target region 11 in relation to other cameras 22 and 23. In this way, the display control unit 9 causes the display device to show regions identified for each camera.

The display control unit 9 causes the display device to show the monitoring target region for each camera as exemplified in FIG. 8, and to further show a cover rate.

In the first exemplary embodiment of the present invention, the display device shows regions corresponding to suitabilities with colors, patterns, brightness or the like according to these suitabilities. As the suitability $T_i$ for a monitoring location i increases, a photographed image in which a monitoring target object is present at this monitoring location i is more suitable for an image recognition process. Therefore, this exemplary embodiment can provide a user with a region in a photographed image containing a monitoring target object which is suitable for an image recognition process in such a way that a user can understand it easily. Consequently, the user can grasp such a region easily. Moreover, by changing the camera parameters and confirming a change in the region, the position, posture, angle of view and the like of a camera can be adjusted easily in such a way that the region expands at the maximum.

Further showing a cover rate can provide a user with an index that indicates a rate of an area of the monitoring target region which can be subjected appropriately to an image recognition process to the whole area of the monitoring target region.

Next, a description will be given of a modification of the first exemplary embodiment. In the first exemplary embodiment, it is not necessarily necessary to show a cover rate. In this case, the system for displaying image recognition processing suitability 1 does not necessarily have to be equipped with the cover rate calculation unit 8 and may skip Step S5 (see FIG. 7).

At Step S6, the display control unit 9 may cause the display device to emphatically show a region corresponding to suitability that falls within a designated numeral range. There is no specific limitation on how to designate this numeral range. For example, a user enters the numeral range of suitability corresponding to a region to be emphatically shown into the system for displaying image recognition processing suitability 1. Then, the display control unit 9 may cause the display device to emphatically show a region corresponding to the suitability that falls within the numeral range designated by the user.

Suppose a region 54 exemplified in FIG. 8 corresponds to suitability in the range of X to Y. In this case, when a user designates the range of X to Y, the display control unit 9 causes the display device to emphatically show the region 54. Exemplary methods for emphasizing a certain region include a method for showing the other regions with a single color. In this example, by showing the regions other than the region 54 uniformly with a single color, the region 54 can be emphasized. However, the display control unit 9 may employ another method in order to provide an emphasizing display. Note that when the display control unit 9 provides an emphasizing display, it preferably causes the display device to further show the presence area of the obstacle 12.

Exemplary Embodiment 2

The suitability calculation unit 7 in the first exemplary embodiment described above calculates suitabilities by using resolution evaluation values, gazing point angle evaluation values and non-hiding rates. In contrast, a suitability calculation unit in a second exemplary embodiment does not use non-hiding rates and calculates suitabilities by using resolution evaluation values and gazing point angle evaluation values. Therefore, in the present invention, a suitability calculation unit calculates suitabilities by using at least resolution evaluation values and gazing point angle evaluation values.

The first exemplary embodiment provides a user with regions corresponding to suitabilities as exemplified in FIG. 8. The second exemplary embodiment provides a user with regions corresponding to suitabilities calculated without using non-hiding rates. In addition, a display control unit divides a monitoring target region in accordance with the non-hiding rates for individual locations and causes a display device to show these divisional regions. In short, the display control unit in the second exemplary embodiment provides a user directly with the difference in non-hiding rate among locations.

Figure 9:
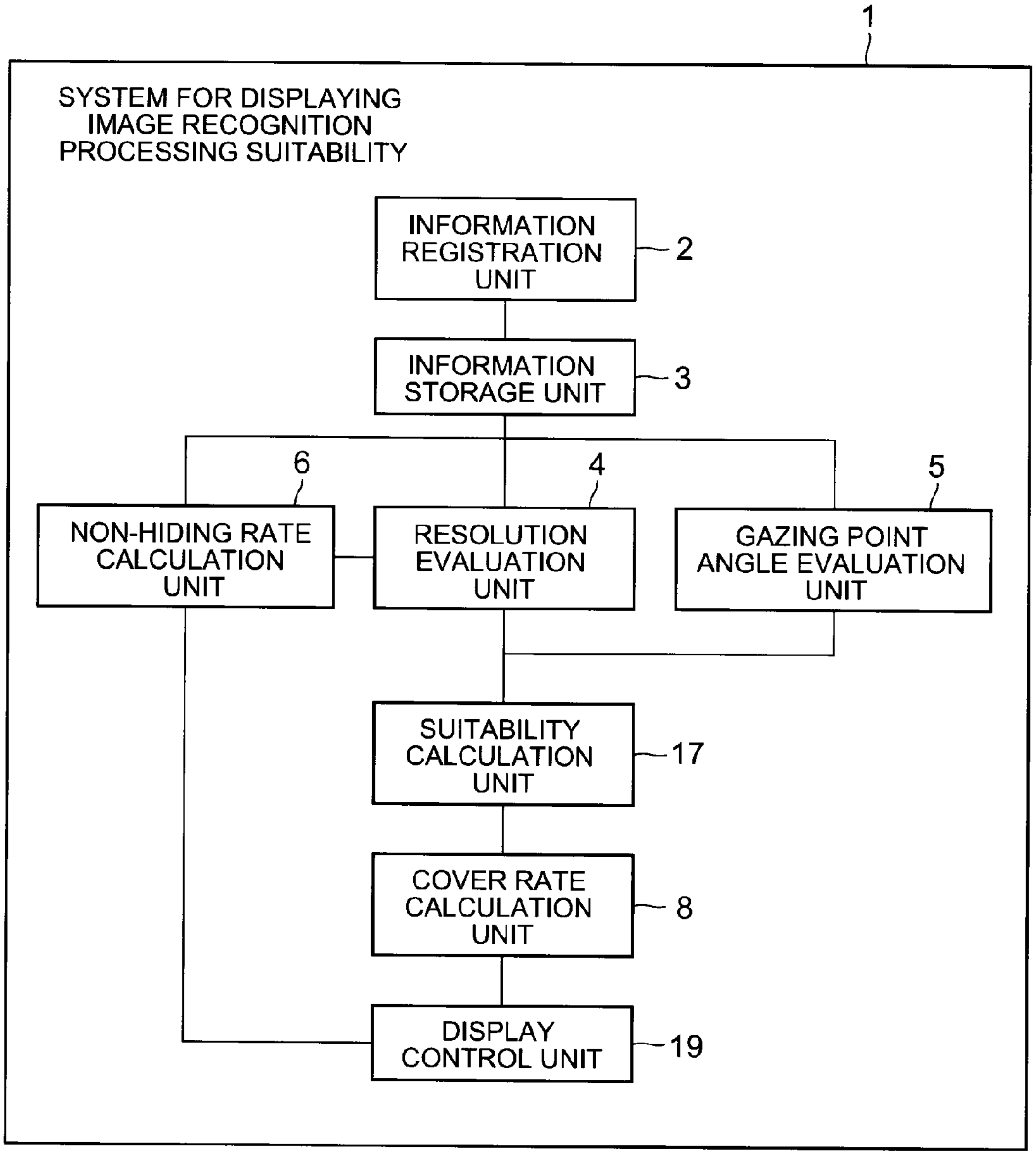
FIG. 9 It depicts a block diagram illustrating an exemplary configuration of a system for displaying image recognition processing suitability in a second exemplary embodiment of the present invention.

FIG. 9 is a block diagram illustrating an exemplary configuration of a system for displaying image recognition processing suitability in the second exemplary embodiment of the present invention. Components that are identical to those in the first exemplary embodiment are given the same letter symbols in FIG. 1, and will not be described. A system for displaying image recognition processing suitability 1 in the second exemplary embodiment includes a suitability calculation unit 17 and a display control unit 19, instead of the suitability calculation unit 7 and the display control unit 9 in the first exemplary embodiment.

The suitability calculation unit 17 is identical to the suitability calculation unit 7 (see FIG. 1) in the first exemplary embodiment, except for calculating suitabilities without using non-hiding rates. More specifically, the suitability calculation unit 17 calculates the suitabilities $T_i$ for monitoring locations i of interest, on the basis of the resolution evaluation values $SR_i$ and gazing point angle evaluation values $SA_i$ for the monitoring locations i.

For example, the suitability calculation unit 17 may calculate the suitabilities $T_i$ as the product of the resolution evaluation value $SR_i$ and the gazing point angle evaluation value $SA_i$. More specifically, the suitability calculation unit 17 may calculate the suitabilities $T_i$ for the monitoring locations i through the computation using equation (7) described below.

$$T_i = SR_i \times SA_i \quad \text{Equation (7)}$$

The suitability calculation unit 17 may weight the resolution evaluation values and the gazing point angle evaluation values when calculating the suitabilities $T_i$. For example, the suitability calculation unit 17 may calculate the suitabilities $T_i$ for the monitoring locations i through the computation using equation (8) described below.

$$T_i = \{(W_1 \times SR_i) + (W_2 \times SA_i)\}/(W_1 + W_2) \quad \text{Equation (8)}$$

$W_1$ and $W_2$ in equation (8) are the same as $W_1$ and $W_2$ respectively, in equation (4).

If a single preset weight coefficient is used, the suitability calculation unit 17 may calculate the suitabilities $T_i$ for the monitoring locations i through the computation using equation (9) described below.

$$T_i = W \times SR_i + (1 - W) \times SA_i \quad \text{Equation (9)}$$

W in equation (9) is the same as W in equation (5).

Any of equations (7) to (9) can be used to determine suitabilities. Similar to the first exemplary embodiment, as the suitability $T_i$ for a monitoring location i increases, a photographed image in which a monitoring target object is placed at this monitoring location i is more suitable for an image recognition process.

After calculating the suitability for each monitoring location, the suitability calculation unit 17 identifies the regions from the monitoring target region which correspond to the calculated suitabilities. The suitability calculation unit 17 performs the process through which the suitabilities are calculated for the monitoring locations and the regions corresponding to the suitabilities are identified, for each camera. This processing is the same as in the first exemplary embodiment.

A cover rate calculation unit 8 calculates the cover rate for each camera by using the suitabilities calculated by the suitability calculation unit 17. A method for calculating a cover rate is the same as in the first exemplary embodiment. Specifically, the cover rate calculation unit 8 calculates the cover rate for each camera through the computation using equation (6).

The display control unit 19 divides the monitoring target region in accordance with the non-hiding rates for the monitoring locations which the non-hiding rate calculation unit 6 has calculated. Then, the display control unit 19 causes the display device to show the divisional monitoring target regions. In this case, the display control unit 19 causes the display device to show the regions in the monitoring target region which corresponds to the suitabilities, in a mode commensurate with these suitabilities. An exemplary display in the second exemplary embodiment will be described later.

Both the suitability calculation unit 17 and the display control unit 19 are implemented by using, for example, the CPU in a computer operating in accordance with a program for displaying image recognition processing suitability.

Figure 10:
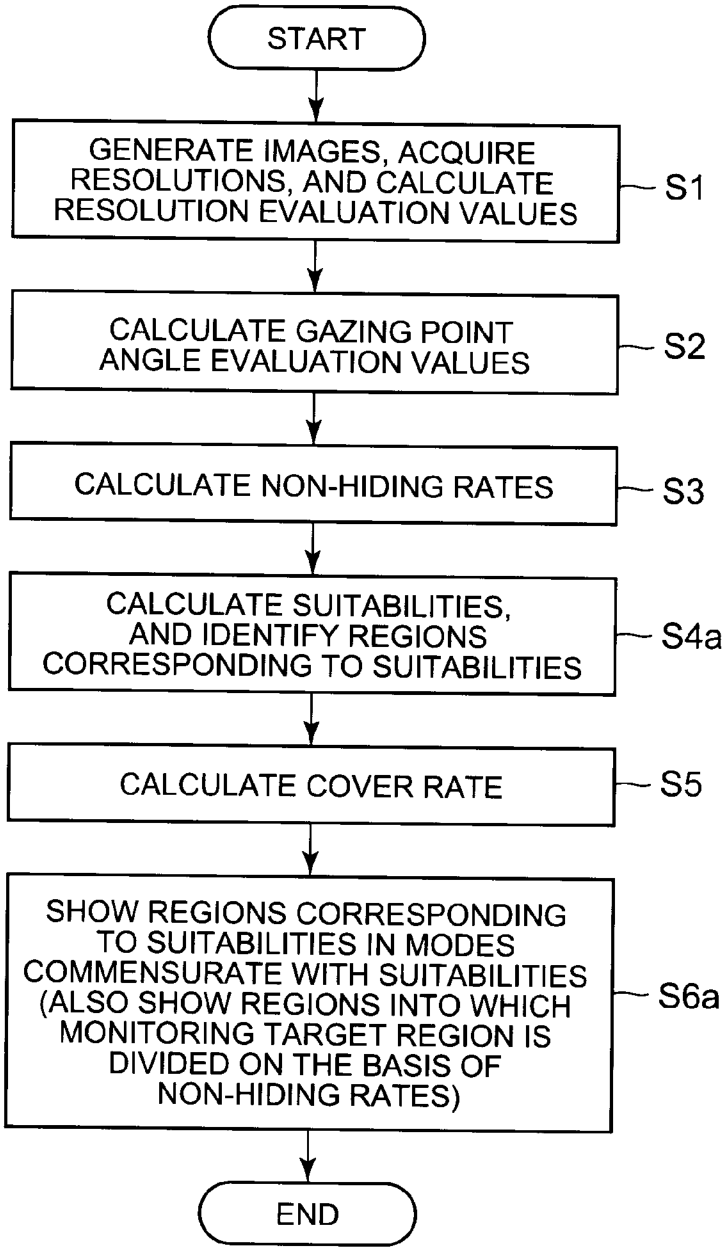
FIG. 10 It is a flowchart of the progress of an exemplary process in the second exemplary embodiment.

FIG. 10 is a flowchart of the progress of an exemplary process in the second exemplary embodiment. Steps S1 to S3 are the same as Steps S1 to S3 in the first exemplary embodiment.

The suitability calculation unit 17 calculates the suitabilities for the monitoring locations by using the resolution evaluation values and gazing point angle evaluation values for the monitoring locations which have been calculated at Steps S1 and S2 (Step S4*a*). For example, the suitability calculation unit 17 may calculate the suitabilities $T_i$ for the monitoring locations i through the computation using equation (7). Alternatively, the suitability calculation unit 17 may calculate the suitabilities $T_i$ through the computation using equation (8) or (9). The suitability calculation unit 17 calculates the suitabilities in this manner for each monitoring location.

The suitability calculation unit 17 identifies the regions corresponding to the suitabilities from the monitoring target region at Step S4*a*. This operation is the same as in the first exemplary embodiment.

The suitability calculation unit 17 performs the process at Step S4*a* for each camera.

The cover rate calculation unit 8 calculates the cover rates by using the suitabilities calculated at Step S4*a* (Step S5). A method for calculating the cover rates is the same as the method for calculating the cover rates in the first exemplary embodiment.

The display control unit 19 divides the monitoring target region in accordance with the non-hiding rates for the monitoring locations which have been calculated at Step S3. Then, the display control unit 19 causes the display device to show these divisional monitoring target regions. In this case, the display control unit 19 causes the display device to show the regions within the monitoring target region which correspond to the suitabilities, in a mode commensurate with these suitabilities (Step S6*a*).

Figure 11:
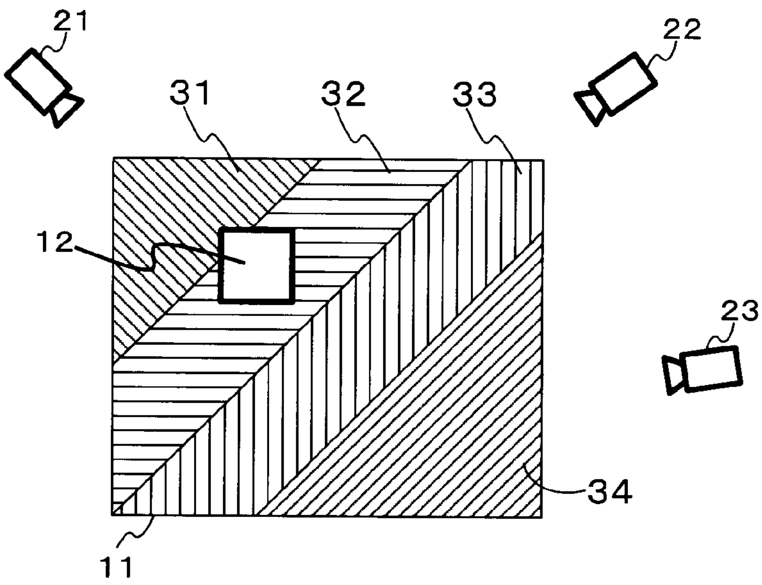
FIG. 11 It depicts an illustrative view of an exemplary display when regions identified in accordance with suitabilities that have been calculated without using non-hiding rates are distinguished from one another.

At Step S6*a*, the display control unit 19 causes the display device to show both the regions defined by dividing the monitoring target region on the basis of the non-hiding rates and the regions identified on the basis of the suitabilities. In other words, the monitoring target region is divided on the basis of the two categories; a non-hiding rate and suitability. In this case, in order to distinguish the divisional regions based on the non-hiding rates from one another, the display control unit 19 may employ a method different from that for distinguishing the regions identified on the basis of the suitabilities. FIG. 11 is an illustrative view of an exemplary display when regions identified in accordance with suitabilities that have been calculated without using non-hiding rates are distinguished from one another. In the example of FIG. 11, the suitability increases from an upper left region 31 to a lower right region 34. For example, the display control unit 19 causes the display device to show the regions identified on the basis of the suitabilities with different patterns, as exemplified in FIG. 11, in order to distinguish these regions from one another. In this case, items other than patterns (e.g., colors or brightness) may be used to distinguish divisional regions based on non-hiding rates from one another.

Figure 12:
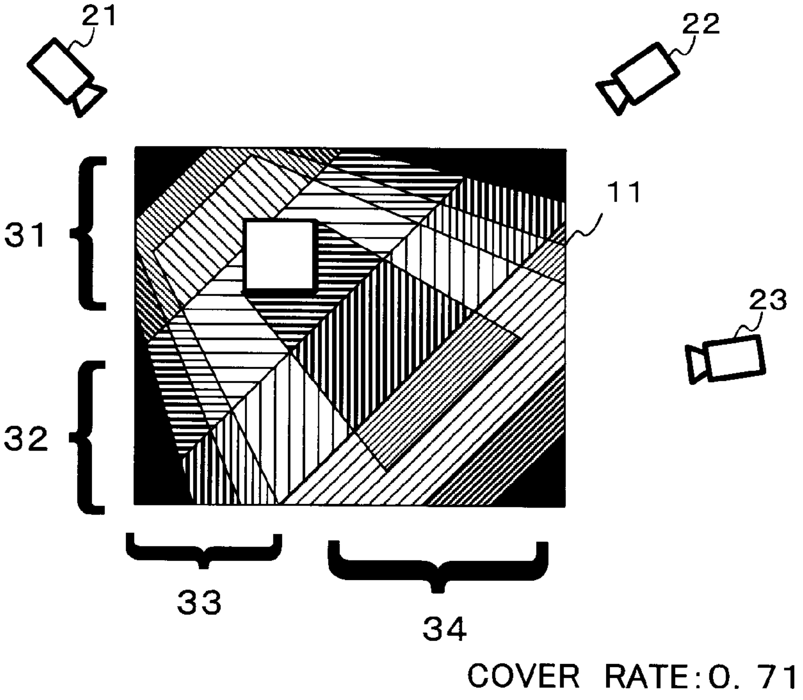
FIG. 12 It depicts an illustrative view of an exemplary display in the second exemplary embodiment.
Figure 1:
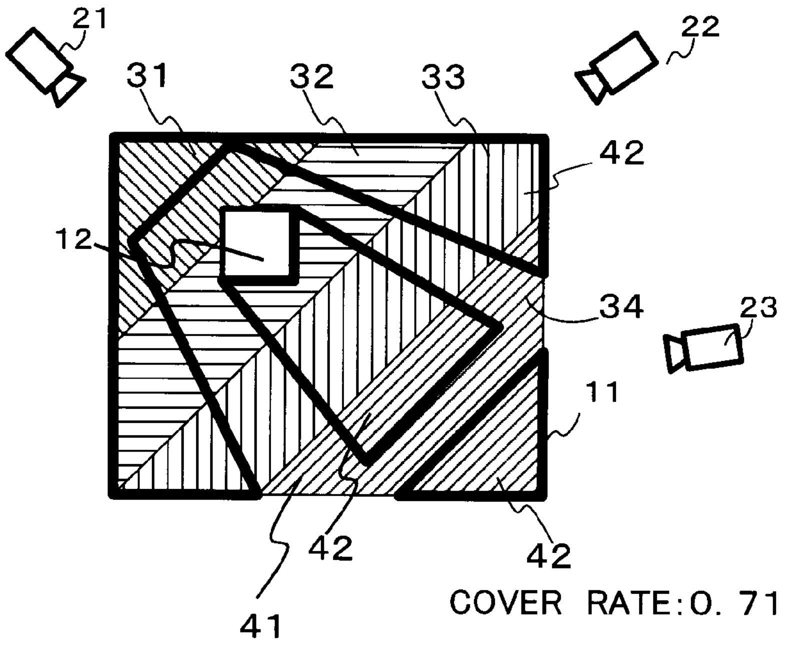

In the example depicted in FIG. 11, specifically, the regions 31 to 34, which correspond to different suitability areas, are shown with different patterns. Each of these regions 31 to 34 may be further divided on the basis of the non-hiding rates. When dividing the region 31 on the basis of the non-hiding rates, the display control unit 19 may cause the display device to display the divisional regions within the region 31 by distinguishing them from one another with, for example, brightness. This is also applied to the remaining regions 32, 33 and 34. In this case, a description will be given regarding an exemplary case where the display control unit 19 increases the brightness of a region as its non-hiding rate increases and decreases the brightness of a region as its non-hiding rate decreases. FIG. 12 depicts an exemplary display of a monitoring target region in which its regions are distinguished from one another in the above manner. In FIG. 12, a variation in brightness is schematically shown with the spacings between lines in stripe patterns. More specifically, in FIG. 12, lines arranged at smaller spacings show lower brightness, whereas lines arranged at larger spacings show higher brightness.

If the monitoring target region 11 is shown as in the example in FIG. 12, a user can determine that the suitability increases from the region 31 to the region 34 on the basis of the difference in pattern among the regions 31 to 34. Referring to the region 31 in the example depicted in FIG. 12, for example, its brightness increases toward the center of the monitoring target region 11 (the spacing of the lines increases). In other words, its brightness decreases toward the edge of the monitoring target region (the spacing of the lines decreases). Consequently, the user can determine that a site in the region 31 which is closer to the center of the monitoring target region is more suitable for an image recognition process because it exhibits a higher non-hiding rate. On the other hand, the user can determine that a site in the region 31 which is closer to the edge of the monitoring target region is less preferable for an image recognition process. The user can determine the remaining regions 32 to 34 likewise on the basis of their brightness.

In this way, a user can individually determine the preferences of regions on the basis of their suitabilities and the preferences of regions on the basis of non-hiding rates.

In the example described above, the divisional regions based on their non-hiding rates are expressed with varying brightness; however these regions may be expressed with, for example, different colors.

When dividing a monitoring target region on the basis of non-hiding rates, the display control unit 19 may classify each divisional region into two regions; a region with a non-hiding rate of 1 and a region with a non-hiding rate less than 1. In this case, the display control unit 19 only has to cause the display device to show the border between regions with a non-hiding rate of 1 and less than 1. FIG. 13 illustrates an exemplary display of this case. In the example depicted in FIG. 13, the ranges 31 to 34 corresponding to the suitabilities are distinguished from one another with patterns, similar to the example depicted in FIG. 11. In addition, a region 41 with a non-hiding rate of 1 and a region 42 with a non-hiding rate less than 1 are distinguished from each other within the monitoring target region 11 by a border. With the display exemplified in FIG. 13, a user can individually determine the preference of regions on the basis of their suitabilities and the preference of regions on the basis of their non-hiding rates.

In FIGS. 12 and 13, the regions identified from the monitoring target region 11 in relation to the camera 21 are illustrated. Likewise, the display control unit 19 causes the display device to show regions identified from the monitoring target region 11 in relation to another camera 22 or 23. In short, the display control unit 19 causes the display device to show identified regions in relation to each camera.

As illustrated in FIGS. 12 and 13, the display control unit 19 causes the display device to further show the cover rate.

According to the second exemplary embodiment, a system for displaying image recognition processing suitability causes a display device to show regions corresponding to suitabilities in a mode commensurate with these suitabilities. Therefore, it produces the same effects as the first exemplary embodiment. In addition, the system for displaying image recognition processing suitability in the second exemplary embodiment causes the display device to show regions into which a monitoring target region is divided on the basis of non-hiding rates. This enables a user to individually determine the preference of individual regions on the basis of their suitabilities and the preference of individual regions on the basis of their non-hiding rates.

Next, a description will be given of a modification of the second exemplary embodiment. In the second exemplary embodiment, it is not necessarily necessary to show a cover rate. In this case, the system for displaying image recognition processing suitability 1 does not necessarily have to be equipped with the cover rate calculation unit 8 and may skip Step S5 (see FIG. 10).

At Step S6*a*, the display control unit 19 may cause the display device to emphatically show a region corresponding to suitability that falls within a designated numeral range. This modification is similar to one of the modifications described in the first exemplary embodiment (an operation of causing a display device to emphatically show the region corresponding to suitability that falls within a designated numeral range), and a detailed thereof will not be described.

Exemplary Embodiment 3

Figure 14:
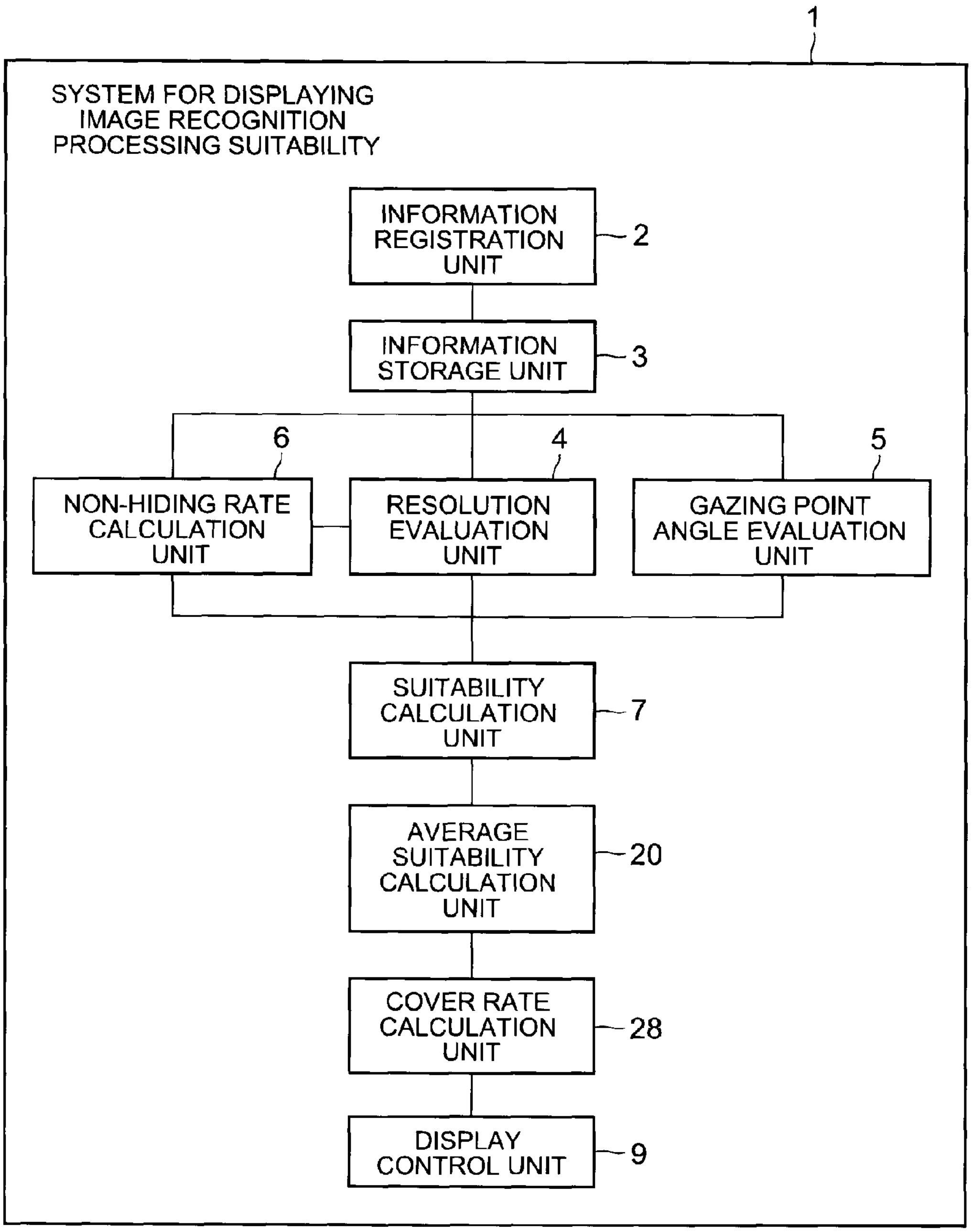
FIG. 14 It depicts a block diagram illustrating an exemplary configuration of a system for displaying image recognition processing suitability in a third exemplary embodiment of the present invention.

FIG. 14 is a block diagram illustrating an exemplary configuration of a system for displaying image recognition processing suitability in a third exemplary embodiment of the present invention. Components that are identical to those in the first exemplary embodiment are given the same letter symbols in FIG. 1, and will not be described. A system for displaying image recognition processing suitability in the third exemplary embodiment includes an average suitability calculation unit 20 in addition to the components in the first exemplary embodiment. Moreover, this system for displaying image recognition processing suitability includes a cover rate calculation unit 28 instead of the cover rate calculation unit 8 in the first exemplary embodiment.

The average suitability calculation unit 20 calculates the average suitability for each monitoring location. The average suitability is an average of a predetermined number of suitabilities sequentially arranged in decreasing order among suitabilities that the suitability calculation unit 7 has calculated for respective cameras in relation to a location of interest within a monitoring target region 11 (excluding the presence area of an obstacle). Suppose the suitabilities are calculated for respective cameras in relation to a monitoring location P within the monitoring target region 11 (excluding the presence area of an obstacle). In addition, the highest to n-th highest suitabilities are determined in a sequence in order to calculate the average suitability. In this case, the average of an n number of suitabilities, ranging from the highest to n-th highest suitabilities, among the suitabilities for the monitoring locations P is set to the average suitability. Thus, the average suitability calculation unit 20 calculates, as the average suitability for the monitoring location P, the average of an n number of suitabilities, ranging from the highest to n-th highest suitabilities, among the suitabilities calculated at the monitoring locations P. Note that the above value "n" has been preset.

Figure 15:
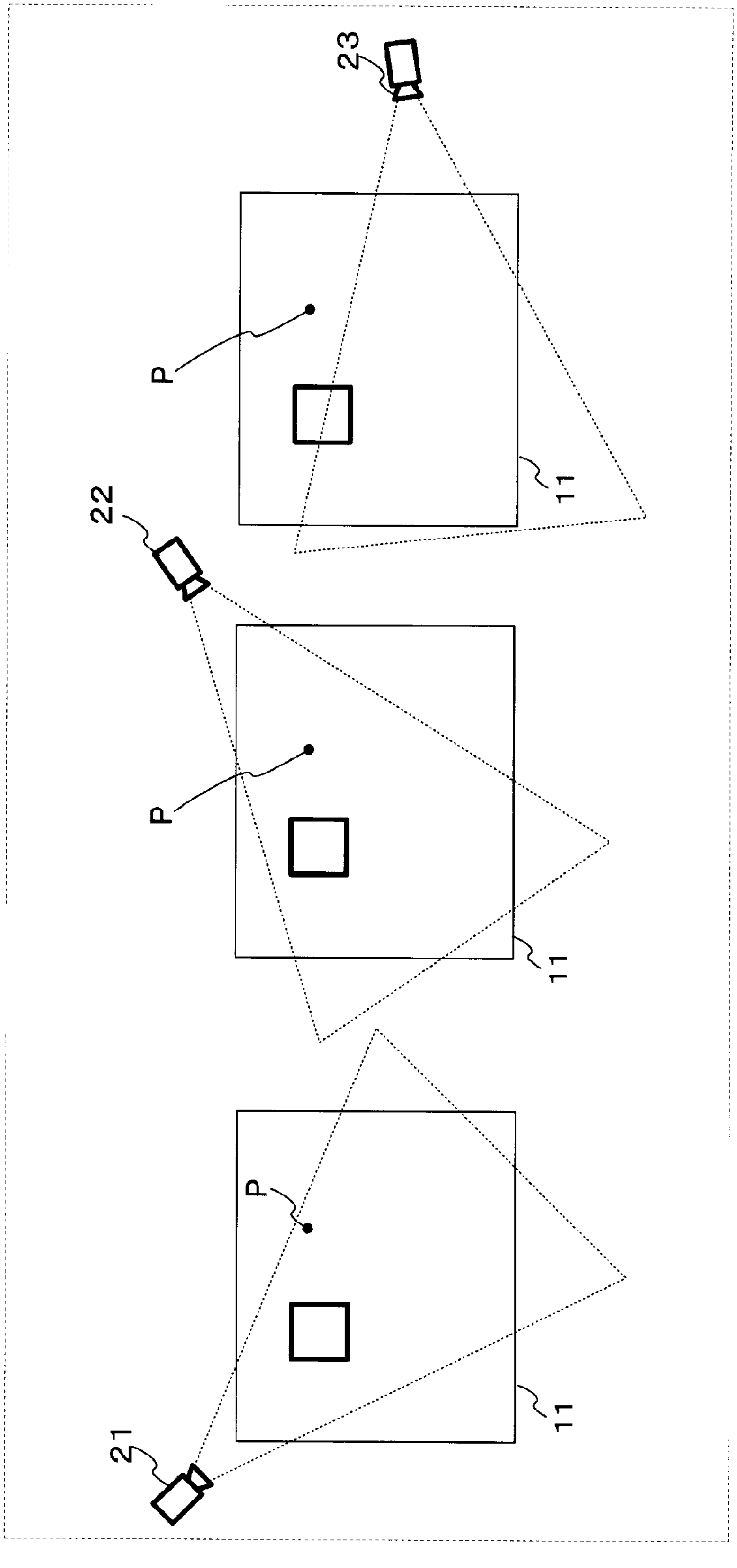
FIG. 15 It depicts an illustrative view of the calculation of average suitability.

FIG. 15 is an illustrative view of the calculation of the average suitability. The camera parameters of three cameras 21 to 23 are stored in an information storage unit 3 in advance. The above n is assumed to be "2." In this case, the suitability calculation unit 7 calculates the suitabilities for a monitoring location P in relation to the respective cameras 21, 22 and 23. This means that three suitabilities are calculated as the suitabilities for this monitoring location P. Then, the average suitability calculation unit 20 calculates an average of the highest and second highest ones of the three suitabilities, as the average suitability. Likewise, the average suitability calculation unit 20 calculates the average suitabilities for the remaining monitoring locations.

The average suitability calculation unit 20 identifies the regions corresponding to the calculated average suitabilities from the monitoring target region.

The cover rate calculation unit 28 calculates the cover rate. Note that the cover rate in the third exemplary embodiment is a rate of the sum of the calculated average suitabilities to the number of monitoring locations. More specifically, the cover rate calculation unit 28 calculates the cover rate through the computation using equation (10) described below.

[Mathematical formula 2]

$$\text{Cover Rate} = \frac{\text{Sum of Calculated Average Suitabilities}}{\text{The Number of Monitoring Locations}} \quad \text{Equation (10)}$$

The cover rate calculated by using equation (10) in the third exemplary embodiment can also be referred to as a "cover rate based on average suitability," but it will be referred to as simply a cover rate, for the purpose of simplifying the following description.

In the first and second exemplary embodiments, the cover rate (cover rate based on suitability) is calculated for each camera. In contrast, in the third exemplary embodiment, a single cover rate (single cover rate based on average suitability) is calculated independently of the number of cameras. It can be said that the cover rate in the third exemplary embodiment is an index that indicates a rate of regions that can be subjected appropriately to an image recognition process to the monitoring target region when a plurality of cameras are considered.

When calculating a cover rate through the computation using equation (10), the cover rate calculation unit 28 may use average suitabilities that fall within a designated numeral range, as targets to be added at the top of the fraction on the right side of equation (10). More specifically, when calculating a cover rate through the computation using equation (10), the cover rate calculation unit 28 adds up average suitabilities that fall within a designated numeral range at the top of the fraction on the right side of equation (10), but ignores suitabilities that fall outside the designated numeral range (e.g., regards these suitabilities as 0). There is no specific limitation on how to designate this numeral range, similar to the first exemplary embodiment.

The display control unit 9 causes a display device (not illustrated) to show the regions within the monitoring target region which correspond to the average suitabilities in a mode commensurate with these average suitabilities. In this case, the display control unit 9 causes the display device to further show the cover rate.

Both the average suitability calculation unit 20 and the cover rate calculation unit 28 are implemented by using, for example, the CPU in a computer operating in accordance with a program for displaying image recognition processing suitability.

Figure 16:
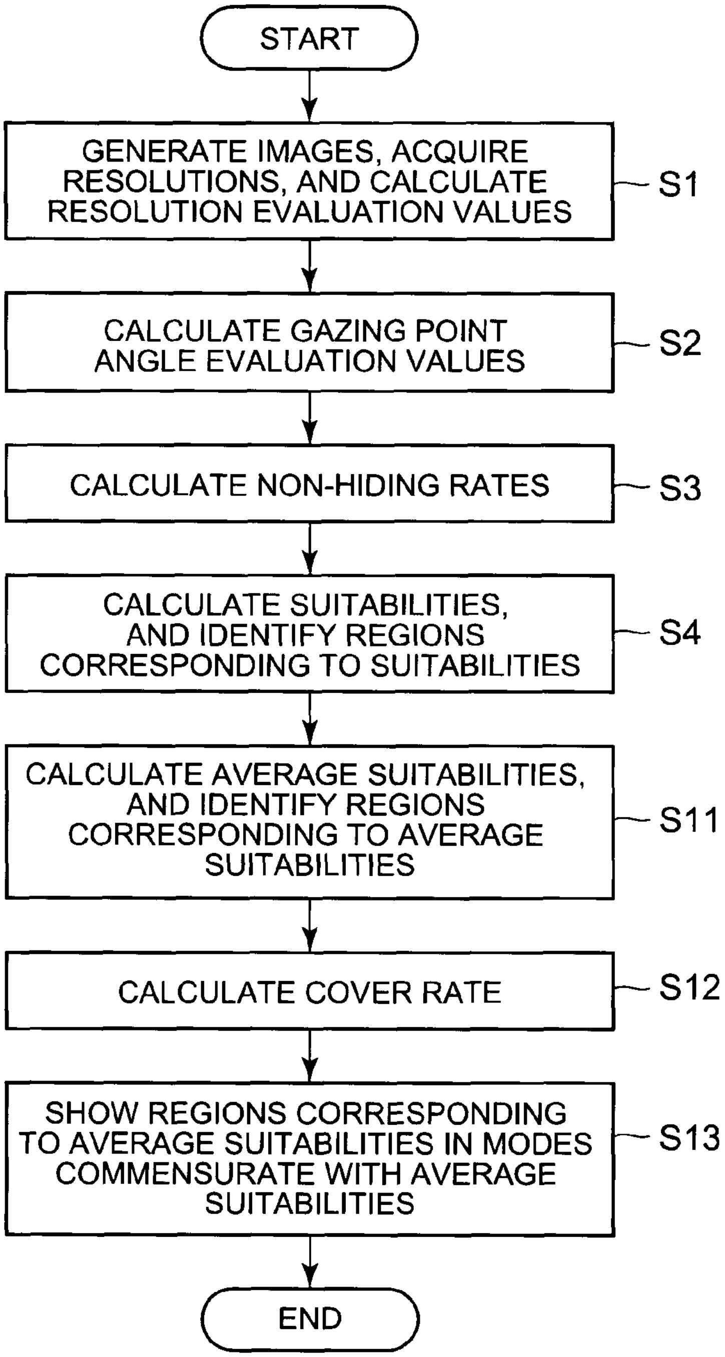
FIG. 16 It depicts a flowchart of the progress of an exemplary process in the third exemplary embodiment.

FIG. 16 is a flowchart of the progress of an exemplary process in the third exemplary embodiment. Steps S1 to S4 are the same as Steps S1 to S4 (see FIG. 7) in the first exemplary embodiment and will not be described.

After Step S4, the average suitability calculation unit 20 calculates the average suitability for each monitoring location. Then, the average suitability calculation unit 20 identifies the regions corresponding to the average suitabilities from the monitoring target region (Step S11). For example, the average suitability calculation unit 20 may identify regions corresponding to the numeral range for each numeral ranges of average suitability.

The cover rate calculation unit 28 calculates the cover rate through the computation using equation (10) (Step S12).

The display control unit 9 causes the display device to show the regions identified at Step S11, as the regions corresponding to the average suitabilities, in a mode commensurate with these average suitabilities. Exemplary methods for displaying the regions in a mode commensurate with the average suitabilities include a method for displaying the regions by distinguishing them from one another with colors, patterns, brightness or the like depending on average suitability.

The display format in the third exemplary embodiment is the same as the display format in the first exemplary embodiment (see FIG. 8). In the third exemplary embodiment, however, since regions are defined on the basis of average suitabilities, a single monitoring target region with identified inner regions is shown independently of the number of cameras. The display control unit 9 causes the display device to further show the presence area of an obstacle within the monitoring target region.

The display control unit 9 causes the display device to further show the cover rate calculated at Step S12. In the third exemplary embodiment, a single value is calculated as the cover rate, independently of the number of cameras. The display control unit 9 causes the display device to show this cover rate.

In the third exemplary embodiment, the display device shows the regions corresponding to average suitabilities with colors, patterns, brightness or the like according to these average suitabilities. Therefore, it is possible to provide a user, in such a way that the user can understand it easily, with a region in a photographed image containing a monitoring target object which is suitable for an image recognition process under the condition of considering a plurality of cameras. Moreover, it is possible for the user to adjust camera parameters easily in such a way that the suitable region expands at the maximum while changing the camera parameters and confirming a change in this region.

Next, a description will be given of a modification of the third exemplary embodiment. In the third exemplary embodiment, it is not necessarily necessary to show a cover rate. In this case, the system for displaying image recognition processing suitability in the third exemplary embodiment does not necessarily have to be equipped with the cover rate calculation unit 28 and may skip Step S12 (see FIG. 16).

At Step S13, the display control unit 9 may cause the display device to emphatically show a region corresponding to average suitability in a designated numeral range. There is no specific limitation on a method for designating this numeral range. For example, a user enters, into the system for displaying image recognition processing suitability 1, the numeral range of average suitability for a region to be emphatically shown. Then, the display control unit 9 may cause the display device to emphatically show a region corresponding to average suitability that falls within the designated numeral range. The operation of the display control unit 9 in this case is similar to one of the modifications described in the first exemplary embodiment (an operation of causing a display device to emphatically show the region corresponding to suitability that falls within a designated numeral range).

Figure 17:
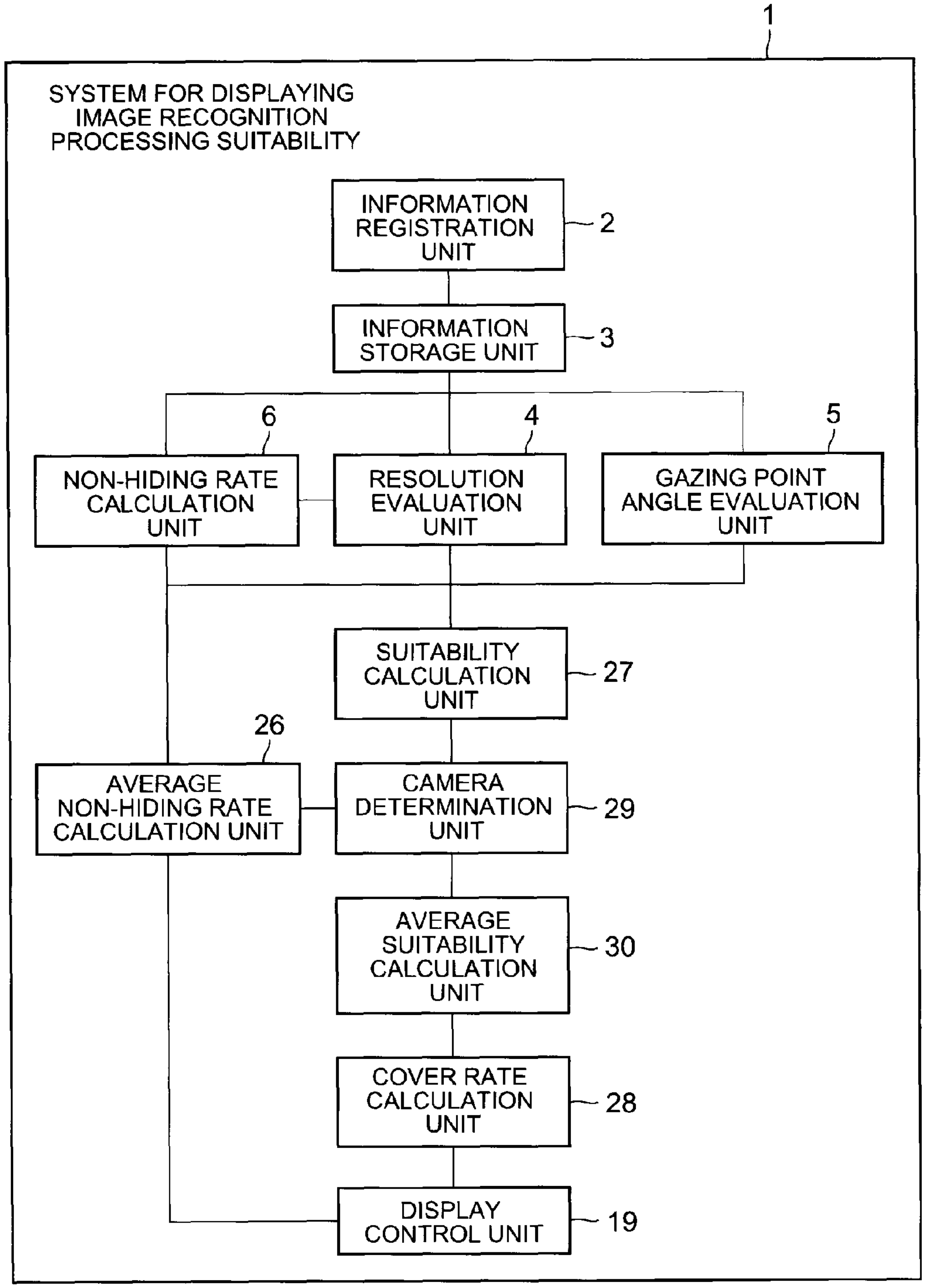
FIG. 17 It is a block diagram depicting an exemplary configuration of the second exemplary embodiment employing the third exemplary embodiment.

As illustrated in FIG. 17, the third exemplary embodiment may be applied to the second exemplary embodiment. In this case, the system for displaying image recognition processing suitability 1 in the second exemplary embodiment may include an average suitability calculation unit 30, and further include a suitability calculation unit 27 and the cover rate calculation unit 28 instead of the suitability calculation unit 17 and the cover rate calculation unit 8. If the third exemplary embodiment is applied to the second exemplary embodiment, a camera determination unit 29 and an average non-hiding rate calculation unit 26 are also provided. In FIG. 17, components that are identical to those in the second and third exemplary embodiments are given the same letter symbols in FIGS. 9 and 14, and will not be described.

In the configuration depicted in FIG. 17, the suitability calculation unit 27 calculates two types of suitabilities for each monitoring location. The first type of suitability is suitability calculated on the basis of a resolution evaluation value, a gazing point angle evaluation value and a non-hiding rate. This suitability is referred to as first suitability. A method for calculating the first suitability is the same as the method for calculating suitability in the first exemplary embodiment. For example, the suitability calculation unit 27 calculates the first suitability through the computation using equation (3), (4) or (5). The second type of suitability is suitability calculated on the basis of a resolution evaluation value and a gazing point angle evaluation value, in which case no non-hiding rate is used. This suitability is referred to as second suitability. A method for calculating the second suitability is the same as the method for calculating suitability in the second exemplary embodiment. For example, the suitability calculation unit 27 calculates the second suitability through the computation using equation (7), (8) or (9). The suitability calculation unit 27 performs a process of calculating the first and second suitabilities for respective monitoring locations in relation to each camera. Accordingly, for each individual monitoring location, a camera is related to first suitability and second suitability. Furthermore, for each individual monitoring location, a camera is also related to a non-hiding rate.

Among the first suitabilities calculated for monitoring locations of interest in relation to each camera, the camera determination unit 29 determines a predetermined number of first suitabilities sequentially arranged in decreasing order from the top. Then, the camera determination unit 29 determines the camera corresponding to the determined first suitabilities. Suppose an n number of cameras are to be determined by the camera determination unit 29. The camera determination unit 29 determines an n number of first suitabilities, ranging from the highest to n-th highest first suitabilities, for a certain monitoring location. Then, the camera determination unit 29 determines an n number of cameras corresponding to the determined n number of first suitabilities. The camera determination unit 29 performs this process for each monitoring location. A description will be given below regarding an exemplary case where an n number of cameras are determined for each monitoring location.

The average suitability calculation unit 30 calculates the average suitability for each monitoring location. This average suitability is an average of an n number of second suitabilities corresponding to an n number of cameras determined for a monitoring location of interest by the camera determination unit 29. Thus, the average suitability calculation unit 30 calculates an average of an n number of second suitabilities corresponding to an n number of cameras determined for each monitoring location by the camera determination unit 29.

The average non-hiding rate calculation unit 26 calculates the average non-hiding rate for each monitoring location. This average non-hiding rate is an average of an n number of non-hiding rates corresponding to an n number of cameras determined for a monitoring location of interest by the camera determination unit 29. Thus, the average non-hiding rate calculation unit 26 calculates an average of an n number of non-hiding rates corresponding to an n number of cameras determined for each monitoring location by the camera determination unit 29.

Each of the average suitability and average non-hiding rate for a monitoring location has a single value that is independent of the number of cameras.

The suitability calculation unit 27, the camera determination unit 29, the average suitability calculation unit 30 and the average non-hiding rate calculation unit 26 may be implemented by using, for example, the CPU operating in accordance with a program for displaying image recognition processing suitability.

The display control unit 19 divides the monitoring target region in accordance with the average non-hiding rates for the monitoring locations, and causes the display device to show the divisional monitoring target regions. In this case, the display control unit 19 causes the display device to show the regions within the monitoring target region which correspond to the average suitabilities, in a mode commensurate with these average suitabilities. This display format is the same as the display format in the second exemplary embodiment as exemplified in FIG. 12 or 13.

Figure 18:
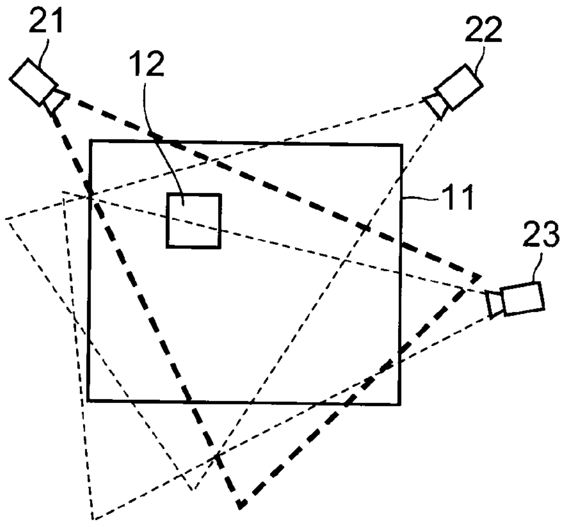
FIG. 18 It depicts an illustrative view of an exemplary display of emphasizing the field of view range of a designated camera.

In the first to third exemplary embodiments and their modifications described above, the display control unit 9 and the display control unit 19 each may receive the designation of a camera from a user, and cause the display device to emphatically show the field of view range of this camera. A description will be given below using the display control unit 9 as an example. FIG. 18 is an illustrative view of an exemplary display of emphasizing the field of view range of a designated camera. In FIG. 18, however, regions identified from the monitoring target region 11 on the basis of suitabilities and the like are not illustrated. The display control unit 9 shows the field of view ranges of the cameras 21 to 23 together with the monitoring target region 11. When the camera 21 is designated, for example, the display control unit 9 causes the display device to emphatically show the field of view range of the camera 21 as depicted in FIG. 18. In this case, it is possible to provide the field of view range of a designated camera in such a way that a user can understand it easily. Note that the field of view range of the camera 21 is emphasized by a thick line in FIG. 18; however it may be emphasized by another method.

In the first to third exemplary embodiments and their modifications described above, a suitability calculation unit may automatically calculate the suitabilities for a plurality of gazing point angles. In this case, a display control unit may cause a display device to give a display that encourages a user to change a photographing direction so that a camera faces in an appropriate direction, on the basis of the gazing point angle corresponding to the highest suitability. Alternatively, the display control unit may cause the display device to give a display that encourages a user to change a photographing direction so that the suitability falls within a preset range instead of becoming highest. In this case, the display control unit may cause the display device to show a message reading, for example, "increase the cover rate by decreasing the depression angle of the camera by 5 degrees.

Figure 19:
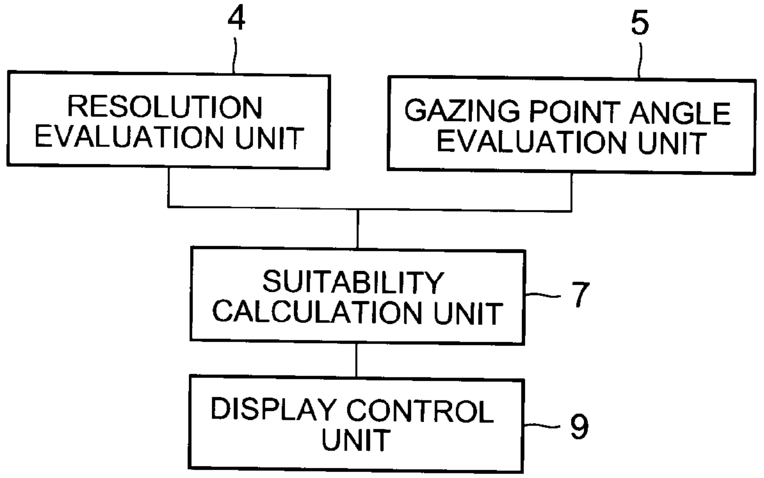
FIG. 19 It depicts a block diagram illustrating exemplary primary units in the present invention.

Next, a description will be given of primary units in the present invention. FIG. 19 is a block diagram of exemplary primary units in the present invention. Primary units in a system for displaying image recognition processing suitability in the present invention includes a resolution evaluation unit 4, a gazing point angle evaluation unit 5, a suitability calculation unit 7 and a display control unit 9.

The resolution evaluation unit 4 performs a process of evaluating, by using a resolution evaluation function, a resolution of a monitoring target object in an image to be acquired when the monitoring target object placed within a preset monitoring target region is photographed and thereby calculating a resolution evaluation value of the monitoring target object at its placement location. The resolution evaluation function defines a relationship between the resolution and a resolution evaluation value indicating suitability for an image recognition process. This calculation of the resolution evaluation value is performed for each location within the monitoring target region excluding a presence area of an obstacle.

The gazing point angle evaluation unit 5 performs a process of evaluating a gazing point angle by using a gazing point angle evaluation function and thereby calculating a gazing point angle evaluation value of the monitoring target object at its placement location. The gazing point angle denotes an angle that the ground forms with a straight line passing through a location of a camera and a gazing point in the monitoring target object placed within the monitoring target region. The gazing point angle evaluation function defines a relationship between the gazing point angle and a gazing point angle evaluation value indicating suitability for the image recognition process. This calculation of the gazing point angle evaluation value is performed for each location within the monitoring target region excluding the presence area of the obstacle.

The suitability calculation unit 7 calculates suitability for each location within the monitoring target region excluding the presence area of the obstacle, on the basis of at least the resolution evaluation value and the gazing point angle evaluation value. The suitability indicates a degree to which the image of the monitoring target object placed at each location is suitable for the image recognition process.

The display control unit 9 causes a display device to show regions within the monitoring target region which correspond to the respective suitabilities, in a mode commensurate with these suitabilities.

Figure 20:
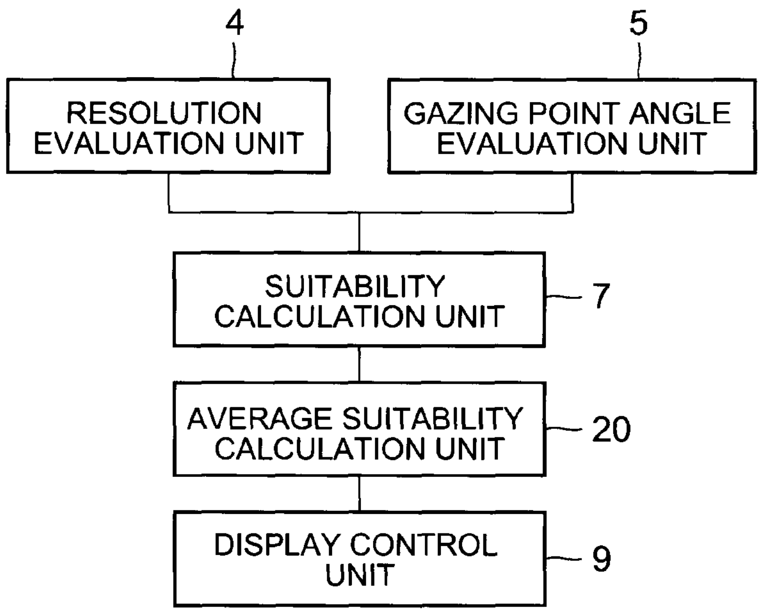
FIG. 20 It depicts a block diagram illustrating other exemplary primary units in the present invention.
Figure 21:
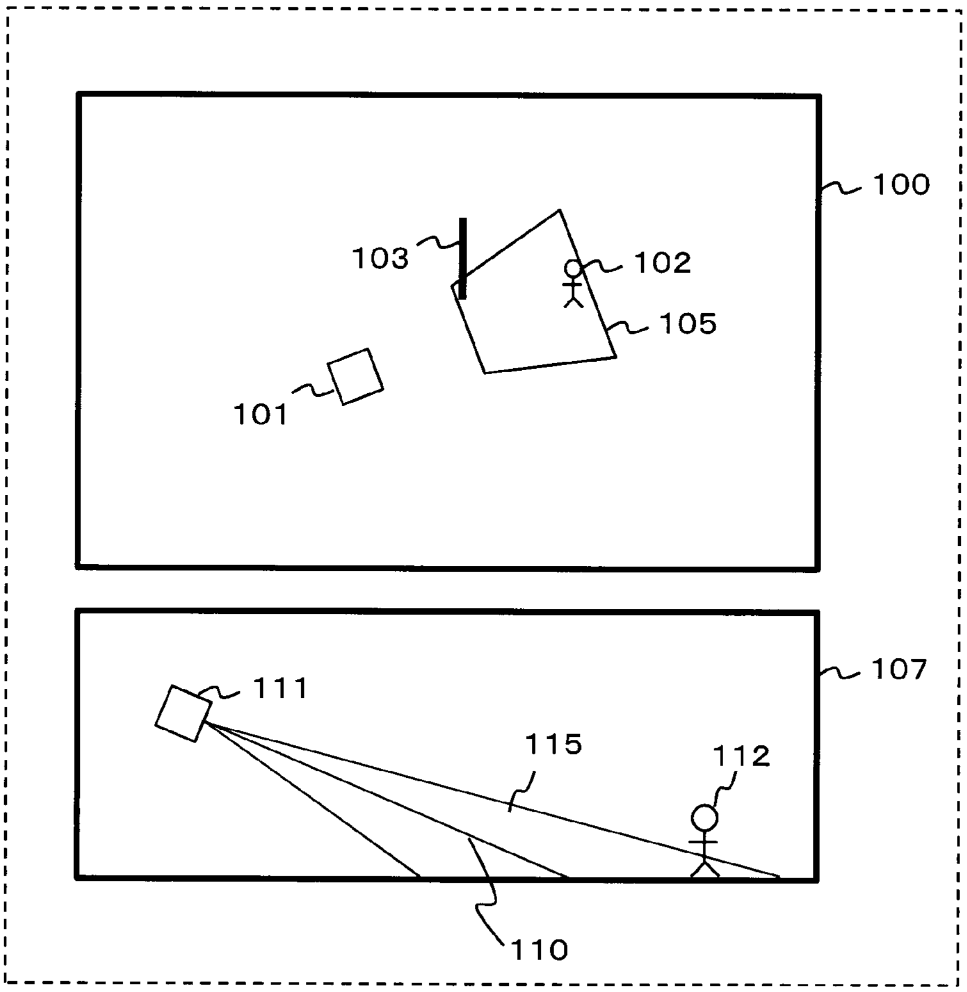
FIG. 21 It depicts schematic views illustrating a horizontal view and a vertical view that a technique described in PLT 1 shows.

FIG. 20 is a block diagram depicting other exemplary primary units in the present invention. A resolution evaluation unit 4, a gazing point angle evaluation unit 5 and a suitability calculation unit 7 are identical to the corresponding components depicted in FIG. 19.

An average suitability calculation unit 20 illustrated in FIG. 20 calculates average suitabilities for respective locations within the monitoring target region excluding the presence area of an obstacle. The average suitability denotes an average of a predetermined number of suitabilities sequentially arranged in decreasing number from top among suitabilities calculated for each camera.

The display control unit 9 illustrated in FIG. 20 causes a display device to show regions within the monitoring target region which correspond to the average suitabilities, in a mode commensurate with these average suitabilities.

The configurations illustrated in FIGS. 19 and 20 can provide the degree to which a photographed image in which a monitoring target object is present at any potential location is suitable for an image recognition process in such a way that a user can understand it easily.

The foregoing exemplary embodiments are partially or entirely described as in Supplementary notes described later but not limited to them.

(Supplementary Note 1)

A system for displaying image recognition processing suitability, including:

a resolution evaluation means for performing a process of evaluating, by using a resolution evaluation function, a resolution of a monitoring target object in an image to be acquired when the monitoring target object placed within a preset monitoring target region is photographed and thereby calculating a resolution evaluation value of the monitoring target object at its placement location, the resolution evaluation function defining a relationship between the resolution and a resolution evaluation value indicating suitability for an image recognition process, calculation of the resolution evaluation value being performed for each location within the monitoring target region excluding a presence area of an obstacle;

a gazing point angle evaluation means for performing a process of evaluating a gazing point angle by using a gazing point angle evaluation function and thereby calculating a gazing point angle evaluation value of the monitoring target object at its placement location, the gazing point angle denoting an angle that the ground forms with a straight line passing through a location of a camera and a gazing point in the monitoring target object placed within the monitoring target region, the gazing point angle evaluation function defining a relationship between the gazing point angle and a gazing point angle evaluation value indicating suitability for the image recognition process, calculation of the gazing point angle evaluation value being performed for each location within the monitoring target region excluding the presence area of the obstacle;

a suitability calculation means for calculating suitability for each location within the monitoring target region excluding the presence area of the obstacle, on the basis of at least the resolution evaluation values and the gazing point angle evaluation values, the suitability indicating a degree to which the image of the monitoring target object placed at each location is suitable for the image recognition process; and a display control means for causing a display device to show regions within the monitoring target region in a mode commensurate with the suitabilities, the regions corresponding to the suitabilities.

(Supplementary Note 2)

The system for displaying image recognition processing suitability according to Supplementary note 1, further including:

a non-hiding rate calculation means for calculating a non-hiding rate for each location within the monitoring target region excluding the presence area of the obstacle, the non-hiding rate denoting a rate of an area of the monitoring target object which is contained in an image and not hidden by the obstacle to the entire area of the monitoring target object in the image, the image being to be acquired when the monitoring target object placed within the monitoring target region is photographed, wherein the suitability calculation means calculates the suitability for each location within the monitoring target region excluding the presence area of the obstacle, on the basis of the resolution evaluation values, the gazing point angle evaluation values and the non-hiding rates.

(Supplementary Note 3)

The system for displaying image recognition processing suitability according to Supplementary note 1, further including:

a non-hiding rate calculation means for calculating a non-hiding rate for each location within the monitoring target region excluding the presence area of the obstacle, the non-hiding rate denoting a rate of an area of the monitoring target object which is contained in an image and not hidden by the obstacle to the entire area of the monitoring target object in the image, the image being to be acquired when the monitoring target object placed within the monitoring target region is photographed, wherein the suitability calculation means calculates the suitability on the basis of the resolution evaluation values and the gazing point angle evaluation values, the non-hiding rates being not used, and the display control means divides the monitoring target region in accordance with the non-hiding rate for each location and causes the display device to show regions within the monitoring target region in a mode commensurate with the suitabilities, the regions corresponding to the suitabilities.

(Supplementary Note 4)

The system for displaying image recognition processing suitability according to any one of Supplementary notes 1 to 3, further including:

a cover rate calculation means for calculating a cover rate for each camera, the cover rate denoting a rate of a sum of the calculated suitabilities to the number of locations at which the suitabilities have been calculated, wherein the display control means causes the display device to show the cover rate for each camera.

(Supplementary Note 5)

The system for displaying image recognition processing suitability according to any one of Supplementary notes 1 to 4, wherein the display control means causes the display device to emphatically show the regions corresponding to the suitabilities that fall within a designated numeral range.

(Supplementary Note 6)

A system for displaying image recognition processing suitability, including:

a resolution evaluation means for performing a process of evaluating, by using a resolution evaluation function, a resolution of a monitoring target object in an image to be acquired when the monitoring target object placed within a preset monitoring target region is photographed and thereby calculating a resolution evaluation value of the monitoring target object at its placement location, the resolution evaluation function defining a relationship between the resolution and a resolution evaluation value indicating suitability for an image recognition process, calculation of the resolution evaluation value being performed for each location within the monitoring target region excluding a presence area of an obstacle;

a gazing point angle evaluation means for performing a process of evaluating a gazing point angle by using a gazing point angle evaluation function and thereby calculating a gazing point angle evaluation value of the monitoring target object at its placement location, the gazing point angle denoting an angle that the ground forms with a straight line passing through a location of a camera and a gazing point in the monitoring target object placed within the monitoring target region, the gazing point angle evaluation function defining a relationship between the gazing point angle and a gazing point angle evaluation value indicating suitability for the image recognition process, calculation of the gazing point angle evaluation value being performed for each location within the monitoring target region excluding the presence area of the obstacle;

a suitability calculation means for calculating suitability for each location within the monitoring target region excluding the presence area of the obstacle, on the basis of at least the resolution evaluation values and the gazing point angle evaluation values, the suitability indicating a degree to which the image of the monitoring target object placed at each location is suitable for the image recognition process;

an average suitability calculation means for calculating average suitability denoting an average of, among the suitabilities calculated for each camera in relation to the locations within the monitoring target region excluding the presence area of the obstacle, a predetermined number of suitabilities sequentially arranged in decreasing order from the top; and a display control means for causing a display device to show regions within the monitoring target region in a mode commensurate with the average suitabilities, the regions corresponding to the average suitabilities.

(Supplementary Note 7)

The system for displaying image recognition processing suitability according to Supplementary note 6, further including:

a non-hiding rate calculation means for calculating a non-hiding rate for each location within the monitoring target region excluding the presence area of the obstacle, the non-hiding rate denoting a rate of an area of the monitoring target object which is contained in an image and not hidden by the obstacle to the entire area of the monitoring target object in the image, the image being to be acquired when the monitoring target object placed within the monitoring target region is photographed, wherein the suitability calculation means calculates the suitability for each location within the monitoring target region excluding the presence area of the obstacle, on the basis of the resolution evaluation values, the gazing point angle evaluation values and the non-hiding rates.

(Supplementary Note 8)

The system for displaying image recognition processing suitability according to Supplementary note 6 or 7, further including:

a cover rate calculation means for calculating a cover rate, the cover rate denoting a rate of a sum of the calculated average suitabilities to the number of locations at which the average suitabilities have been calculated, wherein the display control means causes the display device to show the cover rates.

(Supplementary Note 9)

The system for displaying image recognition processing suitability according to any one of Supplementary notes 6 to 8, wherein the display control means causes the display device to emphatically show the regions corresponding to the average suitabilities that fall within a designated numeral range.

(Supplementary Note 10)

A system for displaying image recognition processing suitability, including:

a suitability calculation means for calculating suitability indicating a degree to which an image is suitable for an image recognition process, on the basis of a resolution of an image and a gazing point angle, the image being to be acquired when a monitoring target region is photographed, the gazing point angle denoting an angle that the ground forms with a straight line passing through a location of a camera and a gazing point in the monitoring target object placed within the monitoring target region; and a display control means for causing a display device to show regions within the monitoring target region in a mode commensurate with the suitabilities, the regions corresponding to the suitabilities.

(Supplementary Note 11)

A system for displaying image recognition processing suitability, including:

a suitability calculation means for calculating suitability indicating a degree to which an image is suitable for an image recognition process, on the basis of a resolution of an image and a gazing point angle, the image being to be acquired when a monitoring target region is photographed, the gazing point angle denoting an angle that the ground forms with a straight line passing through a location of a camera and a gazing point in the monitoring target object placed within the monitoring target region;

a cover rate calculation means for calculating a cover rate of the suitability in the image, for each camera; and a display control means for causing a display device to show the cover rate for each camera.

(Supplementary Note 12)

A method for displaying image recognition processing suitability, including:

calculating suitability indicating a degree to which an image is suitable for an image recognition process, on the basis of a resolution of the image and a gazing point angle, the image being to be acquired when a monitoring target region is photographed, the gazing point angle denoting an angle that the ground forms with a straight line passing through a location of a camera and a gazing point in the monitoring target object placed within the monitoring target region; and causing a display device to show regions within the monitoring target region in a mode commensurate with the suitabilities, the regions corresponding to the suitabilities.

(Supplementary Note 13)

A method for displaying image recognition processing suitability, including:

calculating suitability indicating a degree to which an image is suitable for an image recognition process, on the basis of a resolution of the image and a gazing point angle, the image being to be acquired when a monitoring target region is photographed, the gazing point angle denoting an angle that the ground forms with a straight line passing through a location of a camera and a gazing point in the monitoring target object placed within the monitoring target region;

calculating a cover rate of the suitability in the image, for each camera; and causing a display device to show the cover rate for each camera.

(Supplementary Note 14)

A program for displaying image recognition processing suitability which causes a computer to perform:

a suitability calculation process of calculating suitability indicating a degree to which an image is suitable for an image recognition process, on the basis of a resolution of the image and a gazing point angle, the image being to be acquired when a monitoring target region is photographed, the gazing point angle denoting an angle that the ground forms with a straight line passing through a location of a camera and a gazing point in the monitoring target object placed within the monitoring target region; and a display control process of causing a display device to show regions within the monitoring target region in a mode commensurate with the suitabilities, the regions corresponding to the suitabilities.

(Supplementary Note 15)

A program for displaying image recognition processing suitability which causes a computer to perform:

a suitability calculation process of calculating suitability indicating a degree to which an image is suitable for an image recognition process, on the basis of the resolution of an image and a gazing point angle, the image being to be acquired when a monitoring target region is photographed, the gazing point angle denoting an angle that the ground forms with a straight line passing through a location of a camera and a gazing point in the monitoring target object placed within the monitoring target region;

a cover rate calculation process of calculating a cover rate of the suitability in the image, for each camera; and a display control process of causing a display device to show the cover rate for each camera.

This application is based upon and claims the benefit of priority of the Japanese Patent Application No. 2012-267553 filed on Dec. 6, 2012, the entire contents of which are incorporated herein by reference.

The invention of this application has been described so far with reference to the exemplary embodiments, but is not limited to these exemplary embodiments. Configurations and details of the invention of this application can be modified in various ways so that they stay within its scope and those skilled in the art can understand them.

INDUSTRIAL APPLICABILITY

The present invention is applicable appropriately to a system for displaying image recognition processing suitability that, before an image acquired from a camera is subjected to an image recognition process, evaluates the degree to which the location of a monitoring target object to be photographed in a real space is suitable for the image recognition process and then provides a user with the evaluation result.

REFERENCE SIGNS LIST

1 system for displaying image recognition processing suitability
2 information registration unit
3 information storage unit
4 resolution evaluation unit
5 gazing point angle evaluation unit
6 non-hiding rate calculation unit
7, 17 suitability calculation unit
8, 28 cover rate calculation unit
9, 19 display control unit
20 average suitability calculation unit
26 average non-hiding rate calculation unit

The invention claimed is:

1. A system for displaying image recognition processing suitability, comprising:

a memory comprising instructions;

one or more processors configured to execute the instructions to:

evaluate a resolution of a monitoring target object in an image of a monitoring target region, the evaluation being performed for each of a plurality of locations where the monitoring target object is placed within the monitoring target region, excluding a presence area of an obstacle;

calculate, for each of the plurality of locations, a resolution evaluation value based on the resolution;

evaluate a gazing point angle, the gazing point angle denoting an angle that a ground forms with a straight line passing through a location of a camera and a gazing point in the monitoring target object, the evaluation being performed for each of the plurality of locations;

calculate, for each of the plurality of locations, a gazing point angle evaluation value based on the gazing point angle;

calculate, for each of the plurality of locations, a suitability based on the resolution evaluation value and the gazing point angle evaluation value, the suitability indicating a suitability degree for image recognition of the image with the monitoring target object at a respective location; and display the plurality of locations within the monitoring target region in a mode commensurate with the suitabilities;

wherein the monitoring target region is a region in a physical space subject to an image recognition process.

2. The system for displaying image recognition processing suitability according to claim 1, wherein the one or more processors are further configured to:

calculate, for each of the plurality of locations, a non-hiding rate denoting a ratio of an area of the monitoring target object which is contained in the image and not hidden by the obstacle to an entire area of the monitoring target object in the image; and calculate, for each of the plurality of locations, the suitability for image recognition based on the resolution evaluation value, the gazing point angle evaluation value, and the non-hiding rate.

3. The system for displaying image recognition processing suitability according to claim 1, wherein the one or more processors are further configured to:

calculate, for each of the plurality of locations, a non-hiding rate denoting a ratio of an area of the monitoring target object which is contained in the image and not hidden by the obstacle to an entire area of the monitoring target object in the image; and divide the monitoring target region in accordance with the non-hiding rate for each of the plurality of locations.

4. The system for displaying image recognition processing suitability according to claim 1, wherein the one or more processors are further configured to:

calculate a cover rate for each of a plurality of cameras, the cover rate indicating a ratio of an area of locations whose suitabilities satisfy a pre-determined threshold to a total area of the monitoring region; and display the cover rate for each of the plurality of cameras.

5. The system for displaying image recognition processing suitability according to claim 1, wherein the one or more processors are further configured to:

graphically distinguish, on a display, locations corresponding to suitabilities within a designated range.

6. A system for displaying image recognition processing suitability, comprising:

a memory comprising instructions;

one or more processors configured to execute the instructions to:

evaluate a resolution of a monitoring target object in an image of a monitoring target region, the evaluation being performed for each of a plurality of locations where the monitoring target object is placed within the monitoring target region, excluding a presence area of an obstacle, with respect to each of a plurality of cameras;

calculate, for each of the plurality of locations, a resolution evaluation value based on the resolution, with respect to each of the plurality of cameras;

evaluate a gazing point angle, the gazing point angle denoting an angle that a ground forms with a straight line passing through a location of a camera and a gazing point in the monitoring target object, the evaluation being performed for each of the plurality of locations, with respect to each of the plurality of cameras;

calculate, for each of the plurality of locations, a gazing point angle evaluation value based on the gazing point angle, with respect to each of the plurality of cameras;

calculate, for each of the plurality of locations, a suitability based on the resolution evaluation value and the gazing point angle evaluation value, with respect to each of the plurality of cameras, the suitability indicating a suitability degree for image recognition of the image with the monitoring target object at a respective location;

calculate, for each of the plurality of locations, an average suitability for image recognition, the average suitability denoting an average of suitabilities calculated with respect to each of the plurality of cameras; and display the plurality of locations within the monitoring target region in a mode commensurate with the average suitabilities.

7. The system for displaying image recognition processing suitability according to claim 6, wherein the one or more processors are further configured to:

calculate, for each of the plurality of locations, a non-hiding rate denoting a ratio of an area of the monitoring target object which is contained in the image and not hidden by the obstacle to an entire area of the monitoring target object in the image; and calculate, for each of the plurality of locations, the suitability for image recognition based on the resolution evaluation value, the gazing point angle evaluation value, and the non-hiding rate.

8. The system for displaying image recognition processing suitability according to claim 6, wherein the one or more processors are further configured to:

calculate a cover rate for each of the plurality of cameras, the cover rate indicating a ratio of an area of locations whose suitabilities satisfy a pre-determined threshold to a total area of the monitoring region; and display the cover rate for each of the plurality of cameras.

9. The system for displaying image recognition processing suitability according to claim 6, wherein the one or more processors are further configured to:

graphically distinguish, on a display, locations corresponding to suitabilities within a designated range.

10. A system for displaying image recognition processing suitability, comprising:

a memory comprising instructions;

one or more processors configured to execute the instructions to:

evaluate a resolution of a monitoring target object in an image of a monitoring target region, the evaluation being performed for each of a plurality of locations where the monitoring target object is placed within the monitoring target region, excluding a presence area of an obstacle, with respect to each of a plurality of cameras;

calculate, for each of the plurality of locations, a resolution evaluation value based on the resolution, with respect to each of the plurality of cameras;

evaluate a gazing point angle which denotes an angle that a ground forms with a straight line passing through a location of a camera and a gazing point in the monitoring target object, the evaluation being performed for each of the plurality of locations, with respect to each of the plurality of cameras;

calculate, for each of the plurality of locations, a gazing point angle evaluation value based on the gazing point angle, with respect to each of the plurality of cameras;

calculate, for each of the plurality of locations, a non-hiding rate denoting a ratio of an area of the monitoring target object which is contained in the image and not hidden by the obstacle to an entire area of the monitoring target object in the image, with respect to each of the plurality of cameras;

calculate, for each of the plurality of locations, a first suitability based on the resolution evaluation value, the gazing point angle evaluation value, and the non-hiding rate, with respect to each of the plurality of cameras, the first suitability indicating a first suitability degree for image recognition of the image with the monitoring target object at a respective location;

calculate, for each of the plurality of locations, a second suitability based on the resolution evaluation value and the gazing point angle evaluation value, with respect to each of the plurality of cameras, the second suitability indicating a second suitability degree for image recognition of the image with the monitoring target object at the respective location;

determine, for each of the plurality of locations, cameras corresponding to a number of the first suitabilities;

calculate, for each of the plurality of locations, an average suitability for image recognition, the average suitability denoting an average of the second suitabilities calculated with respect to each determined camera;

calculate, for each of the plurality of locations, an average non-hiding rate denoting an average of the non-hiding rates calculated with respect to each determined camera;

dividing the monitoring target region in accordance with the average non-hiding rate for each of the plurality of locations; and display the plurality of locations within the monitoring target region in a mode commensurate with the average suitabilities.

11. A method, performed by one or more processors, for displaying image recognition processing suitability, the method comprising:

evaluating a resolution of a monitoring target object in an image of a monitoring target region, the evaluation being performed for each of a plurality of locations where the monitoring target object is placed within the monitoring target region, excluding a presence area of an obstacle;

calculating, for each of the plurality of locations, a resolution evaluation value based on the resolution;

evaluating a gazing point angle, the gazing point angle denoting an angle that a ground forms with a straight line passing through a location of a camera and a gazing point in the monitoring target object, the evaluation being performed for each of the plurality of locations;

calculating, for each of the plurality of locations, a gazing point angle evaluation value based on the gazing point angle;

calculating, for each of the plurality of locations, a suitability based on the resolution evaluation value and the gazing point angle evaluation value, the suitability indicating a suitability degree for image recognition of the image with the monitoring target object at a respective location; and displaying the plurality of locations within the monitoring target region in a mode commensurate with the suitabilities;

wherein the monitoring target region is a region in a physical space subject to an image recognition process.

12. The method for displaying image recognition processing suitability according to claim 11, further comprising:

calculating, for each of the plurality of locations, a non-hiding rate denoting a ratio of an area of the monitoring target object which is contained in the image and not hidden by the obstacle to an entire area of the monitoring target object in the image; and calculating, for each of the plurality of locations, the suitability for image recognition based on the resolution evaluation value, the gazing point angle evaluation value, and the non-hiding rate.

13. The method for displaying image recognition processing suitability according to claim 11, further comprising:

calculating, for each of the plurality of locations, a non-hiding rate denoting a ratio of an area of the monitoring target object which is contained in the image and not hidden by the obstacle to an entire area of the monitoring target object in the image; and dividing the monitoring target region in accordance with the non-hiding rate for each of the plurality of locations.

14. The method for displaying image recognition processing suitability according to claim 11, further comprising:

calculating a cover rate for each of a plurality of cameras, the cover rate indicating a ratio of an area of locations whose suitabilities satisfy a pre-determined threshold to a total area of the monitoring region; and displaying the cover rate for each of the plurality of cameras.

15. The method for displaying image recognition processing suitability according to claim 11, further comprising:

graphically distinguishing, on a display, locations corresponding to suitabilities within a designated range.

16. A method, performed by one or more processors, for displaying image recognition processing suitability, the method comprising:

evaluating a resolution of a monitoring target object in an image of a monitoring target region, the evaluation being performed for each of a plurality of locations where the monitoring target object is placed within the monitoring target region, excluding a presence area of an obstacle, with respect to each of a plurality of cameras;

calculating, for each of the plurality of locations, a resolution evaluation value based on the resolution, with respect to each of the plurality of cameras;

evaluating a gazing point angle, the gazing point angle denoting an angle that a ground forms with a straight line passing through a location of a camera and a gazing point in the monitoring target object, the evaluation being performed for each of the plurality of locations, with respect to each of the plurality of cameras;

calculating, for each of the plurality of locations, a gazing point angle evaluation value based on the gazing point angle, with respect to each of the plurality of cameras;

calculating, for each of the plurality of locations, a suitability based on the resolution evaluation value and the gazing point angle evaluation value, with respect to each of the plurality of cameras, the suitability indicating a suitability degree for image recognition of the image with the monitoring target object at a respective location;

calculating, for each of the plurality of locations, an average suitability for image recognition, the average suitability denoting an average of suitabilities calculated with respect to each of the plurality of cameras; and displaying the plurality of locations within the monitoring target region in a mode commensurate with the average suitabilities.

17. The method for displaying image recognition processing suitability according to claim 16, further comprising:

calculating, for each of the plurality of locations, a non-hiding rate denoting a ratio of an area of the monitoring target object which is contained in the image and not hidden by the obstacle to an entire area of the monitoring target object in the image; and calculating, for each of the plurality of locations, the suitability for image recognition based on the resolution evaluation value, the gazing point angle evaluation value, and the non-hiding rate.

18. The method for displaying image recognition processing suitability according to claim 16, further comprising:

calculating a cover rate for each of the plurality of cameras, the cover rate indicating a ratio of an area of locations whose suitabilities satisfy a pre-determined threshold to a total area of the monitoring region; and displaying the cover rate for each of the plurality of cameras.

19. The method for displaying image recognition processing suitability according to claim 16, further comprising:

graphically distinguishing, on a display, locations corresponding to suitabilities within a designated range.

20. A method, performed by one or more processors, for displaying image recognition processing suitability, the method comprising:

evaluating a resolution of a monitoring target object in an image of a monitoring target region, the evaluation being performed for each of a plurality of locations where the monitoring target object is placed within the monitoring target region, excluding a presence area of an obstacle, with respect to each of a plurality of cameras;

calculating, for each of the plurality of locations, a resolution evaluation value based on the resolution, with respect to each of the plurality of cameras;

evaluating a gazing point angle which denotes that a ground forms with a straight line passing through a location of a camera and a gazing point in the monitoring target object, the evaluation being performed for each of the plurality of locations, with respect to each of the plurality of cameras;

calculating, for each of the plurality of locations, a gazing point angle evaluation value based on the gazing point angle, with respect to each of the plurality of cameras;

calculating, for each of the plurality of locations, a non-hiding rate denoting a ratio of an area of the monitoring target object which is contained in the image and not hidden by the obstacle to an entire area of the monitoring target object in the image, with respect to each of the plurality of cameras;

calculating, for each of the plurality of locations, a first suitability based on the resolution evaluation value and the gazing point angle evaluation value, and the non-hiding rate, with respect to each of the plurality of cameras, the first suitability indicating a first suitability degree for image recognition of the image with the monitoring target object at a respective location;

calculating, for each of the plurality of locations, a second suitability based on the resolution evaluation value and the gazing point angle evaluation value, with respect to each of the plurality of cameras, the second suitability indicating a second suitability degree for image recognition of the image with the monitoring target object at the respective location;

determining, for each of the plurality of locations, cameras corresponding to a number of the first suitabilities;

calculating, for each of the plurality of locations, an average suitability for image recognition, the average suitability denoting an average of the second suitabilities calculated with respect to each determined camera;

calculating, for each of the plurality of locations, an average non-hiding rate denoting an average of the non-hiding rates calculated with respect to each determined camera;

dividing the monitoring target region in accordance with the average non-hiding rate for each of the plurality of locations; and display the plurality of locations within the monitoring target region in a mode commensurate with the average suitabilities.

21. A non-transitory computer readable recording medium in which a program for displaying image recognition processing suitability is recorded, wherein the program, when executed by a computer, causes the computer to perform a method comprising:

evaluating a resolution of a monitoring target object in an image of a monitoring target region, the evaluation being performed for each of a plurality of locations where the monitoring target object is placed within the monitoring target region, excluding a presence area of an obstacle;

calculating, for each of the plurality of locations, a resolution evaluation value based on the resolution;

evaluating a gazing point angle, the gazing point angle denoting an angle that a ground forms with a straight line passing through a location of a camera and a gazing point in the monitoring target object, the evaluation being performed for each of the plurality of locations;

calculating, for each of the plurality of locations, a gazing point angle evaluation value based on the gazing point angle;

calculating, for each of the plurality of locations, a suitability based on the resolution evaluation value and the gazing point angle evaluation value, the suitability indicating a suitability degree for image recognition of the image with the monitoring target object at a respective location; and displaying the plurality of locations within the monitoring target region in a mode commensurate with the suitabilities;

wherein the monitoring target region is a region in a physical space subject to an image recognition process.

22. The non-transitory computer readable recording medium in which the program for displaying image recognition processing suitability is recorded according to claim 21, the method further comprising:

calculating, for each of the plurality of locations, a non-hiding rate denoting a ratio of an area of the monitoring target object which is contained in the image and not hidden by the obstacle to an entire area of the monitoring target object in the image; and calculating, for each of the plurality of locations, the suitability for image recognition based on the resolution evaluation value, the gazing point angle evaluation value, and the non-hiding rate.

23. The non-transitory computer readable recording medium in which the program for displaying image recognition processing suitability is recorded according to claim 21, the method further comprising:

calculating, for each of the plurality of locations, a non-hiding rate denoting a ratio of an area of the monitoring target object which is contained in the image and not hidden by the obstacle to an entire area of the monitoring target object in the image; and dividing the monitoring target region in accordance with the non-hiding rate for each of the plurality of locations.

24. The non-transitory computer readable recording medium in which the program for displaying image recognition processing suitability is recorded according to claim 21, the method further comprising:

calculating a cover rate for each of a plurality of cameras, the cover rate indicating a ratio of an area of locations whose suitabilities satisfy a pre-determined threshold to a total area of the monitoring region; and displaying the cover rate for each of the plurality of cameras.

25. The non-transitory computer readable recording medium in which the program for displaying image recognition processing suitability is recorded according to claim 21, the method further comprising:

graphically distinguishing, on a display, locations corresponding to suitabilities within a designated range.

26. A non-transitory computer readable recording medium in which a program for displaying image recognition processing suitability is recorded, the program, when executed by a computer, causes the computer to perform a method comprising:

evaluating a resolution of a monitoring target object in an image of a monitoring target region, the evaluation being performed for each of a plurality of locations where the monitoring target object is placed within the monitoring target region, excluding a presence area of an obstacle, with respect to each of a plurality of cameras;

calculating, for each of the plurality of locations, a resolution evaluation value based on the resolution, with respect to each of the plurality of cameras;

evaluating a gazing point angle, the gazing point angle denoting an angle that a ground forms with a straight line passing through a location of a camera and a gazing point in the monitoring target object, the evaluation being performed for each of the plurality of locations, with respect to each of the plurality of cameras;

calculating, for each of the plurality of locations, a gazing point angle evaluation value based on the gazing point angle, with respect to each of the plurality of cameras;

calculating, for each of the plurality of locations, a suitability based on the resolution evaluation value and the gazing point angle evaluation value, with respect to each of the plurality of cameras, the suitability indicating a suitability degree for image recognition of the image with the monitoring target object at a respective location;

calculating, for each of the plurality of locations, an average suitability for image recognition, the average suitability denoting an average of suitabilities calculated with respect to each of the plurality of cameras; and displaying the plurality of locations within the monitoring target region in a mode commensurate with the average suitabilities.

27. The non-transitory computer readable recording medium in which the program for displaying image recognition processing suitability is recorded according to claim 26, the method further comprising:

calculating, for each of the plurality of locations, a non-hiding rate denoting a ratio of an area of the monitoring target object which is contained in the image and not hidden by the obstacle to an entire area of the monitoring target object in the image; and calculating, for each of the plurality of locations, the suitability for image recognition based on the resolution evaluation value, the gazing point angle evaluation value, and the non-hiding rate.

28. The non-transitory computer readable recording medium in which the program for displaying image recognition processing suitability is recorded according to claim 26, the method further comprising:

calculating a cover rate for each of the plurality of cameras, the cover rate indicating a ratio of an area of locations whose suitabilities satisfy a pre-determined threshold to a total area of the monitoring region; and displaying the cover rate for each of the plurality of cameras.

29. The non-transitory computer readable recording medium in which the program for displaying image recognition processing suitability is recorded according to claim 26, the method further comprising:

graphically distinguishing, on a display, locations corresponding to suitabilities within a designated range.

30. A non-transitory computer readable recording medium in which a program for displaying image recognition processing suitability is recorded, the program, when executed by a computer, causes the computer to perform a method comprising:

evaluating a resolution of a monitoring target object in an image of a monitoring target region, the evaluation being performed for each of a plurality of locations where the monitoring target object is placed within the monitoring target region, excluding a presence area of an obstacle, with respect to each of a plurality of cameras;

calculating, for each of the plurality of locations, a resolution evaluation value based on the resolution, with respect to each of the plurality of cameras;

evaluating a gazing point angle which denotes that a ground forms with a straight line passing through a location of a camera and a gazing point in the monitoring target object, the evaluation being performed for each of the plurality of locations, and with respect to each of the plurality of cameras;

calculating, for each of the plurality of locations, a gazing point angle evaluation value based on the gazing point angle, with respect to each of the plurality of cameras;

calculating, for each of the plurality of locations, a non-hiding rate denoting a ratio of an area of the monitoring target object which is contained in the image and not hidden by the obstacle to an entire area of the monitoring target object in the image, with respect to each of the plurality of cameras;

calculating, for each of the plurality of locations, a first suitability based on the resolution evaluation value and the gazing point angle evaluation value, and the non-hiding rate, with respect to each of the plurality of cameras, the first suitability indicating a first suitability degree for image recognition of the image with the monitoring target object at a respective location;

calculating, for each of the plurality of locations, a second suitability based on the resolution evaluation value and the gazing point angle evaluation value, with respect to each of the plurality of cameras, the second suitability indicating a second suitability degree for image recognition of the image with the monitoring target object at the respective location;

determining, for each of the plurality of locations, cameras corresponding to a number of the first suitabilities;

calculating, for each of the plurality of locations, an average suitability for image recognition, the average suitability denoting an average of the second suitabilities calculated with respect to each determined camera;

calculating, for each of the plurality of locations, an average non-hiding rate denoting an average of the non-hiding rates calculated with respect to each determined camera;

dividing the monitoring target region in accordance with the average non-hiding rate for each of the plurality of locations; and displaying the plurality of locations within the monitoring target region in a mode commensurate with the average suitabilities.

31. A system for displaying image recognition processing suitability, comprising:

a memory comprising instructions;

one or more processors configured to execute the instructions to:

evaluate a resolution of a monitoring target object in an image of a monitoring target region, the evaluation being performed for each of a plurality of locations where the monitoring target object is placed within the monitoring target region, excluding a presence area of an obstacle;

evaluate a gazing point angle, the gazing point angle denoting an angle that a ground forms with a straight line passing through a location of a camera and a gazing point in the monitoring target object, the evaluation being performed for each of the plurality of locations;

calculate, for each of the plurality of locations, a suitability based on the resolution and the gazing point angle, the suitability indicating a suitability degree for image recognition of the image with the monitoring target object at a respective location; and display the plurality of locations within the monitoring target region in a mode commensurate with the suitabilities;

wherein the monitoring target region is a region in a physical space subject to an image recognition process.

32. A system for displaying image recognition processing suitability, comprising:

a memory comprising instructions;

one or more processors configured to execute the instructions to:

evaluate a resolution of a monitoring target object in an image of a monitoring target region, the evaluation being performed for each of a plurality of locations where the monitoring target object is placed within the monitoring target region, excluding a presence area of an obstacle;

evaluate a gazing point angle, the gazing point angle denoting an angle that a ground forms with a straight line passing through a location of a camera and a gazing point in the monitoring target object, the evaluation being performed for each of the plurality of locations;

calculate, for each of the plurality of locations, a suitability based on the resolution and the gazing point angle, the suitability indicating a suitability degree for image recognition of the image with the monitoring target object at a respective location; and display the plurality of locations within the monitoring target region in a mode commensurate with the suitabilities;

wherein the monitoring target region is a region in a physical space subject to an image recognition process;

wherein the one or more processors are further configured to calculate a cover rate for each of a plurality of cameras, the cover rate indicating a ratio of an area of locations whose suitabilities satisfy a predetermined threshold to a total area of the monitoring region; and display the cover rate for each of the plurality of cameras.

* * * * *